(12) United States Patent
Feinbloom et al.

(10) Patent No.: US 10,465,892 B1
(45) Date of Patent: Nov. 5, 2019

(54) CORDLESS HEADLIGHT AND CONTROL THEREOF

(71) Applicant: Designs for Vision, Inc., Bohemia, NY (US)

(72) Inventors: Richard E. Feinbloom, New York, NY (US); Kenneth N Braganca, Sayville, NY (US); Michael D. Ross, Commack, NY (US)

(73) Assignee: Designs for Vision, Inc., Bohemia, NY (US)

( * ) Notice: Subject to any disclaimer, the term of this patent is extended or adjusted under 35 U.S.C. 154(b) by 0 days.

(21) Appl. No.: 16/296,130

(22) Filed: Mar. 7, 2019

Related U.S. Application Data

(63) Continuation-in-part of application No. 16/146,601, filed on Sep. 28, 2018, which is a continuation of application No. 15/703,161, filed on Sep. 13, 2017, now Pat. No. 10,132,483, which is a continuation of application No. 15/347,759, filed on Nov. 9, 2016,
(Continued)

(51) Int. Cl.
| | |
|---|---|
| *H05B 37/02* | (2006.01) |
| *F21V 23/04* | (2006.01) |
| *H05B 33/08* | (2006.01) |
| *F21L 4/04* | (2006.01) |
| *G02C 11/04* | (2006.01) |
| *G02C 7/08* | (2006.01) |
| *F21W 131/20* | (2006.01) |

(Continued)

(52) U.S. Cl.
CPC ............ *F21V 23/0471* (2013.01); *F21L 4/04* (2013.01); *G02C 11/04* (2013.01); *H05B 33/0872* (2013.01); *H05B 37/0227* (2013.01); *F21V 23/0492* (2013.01); *F21W 2131/20* (2013.01); *F21Y 2115/10* (2016.08); *G02C 5/02* (2013.01); *G02C 7/088* (2013.01); *Y02B 20/343* (2013.01); *Y02B 20/346* (2013.01); *Y02B 20/348* (2013.01); *Y02B 20/44* (2013.01)

(58) Field of Classification Search
CPC ................ H05B 37/02; H05B 37/0227; H05B 33/0872; H05B 33/0815; F21V 23/0471; F21V 23/0485; F21V 23/0442; F21V 21/084; F21V 21/30; Y02B 20/346; Y02B 20/46; G02C 11/04; G02C 11/10; G02C 7/088; F21S 41/00; F21S 41/141; F21S 41/663; A61B 2090/502; A61B 2090/309; A61B 2017/00734; B60Q 1/04; B60Q 1/1423
See application file for complete search history.

(56) References Cited

U.S. PATENT DOCUMENTS

| | | |
|---|---|---|
| 3,890,383 A | 8/1975 | Herbits |
| 4,195,918 A | 4/1980 | Freche |

(Continued)

*Primary Examiner* — Haissa Philogene
(74) *Attorney, Agent, or Firm* — Law Office of Carl Giordano, PC

(57) ABSTRACT

A wireless headlight assembly for attachment to an eyewear frame is disclosed. The wireless headlight assembly comprises a battery pod containing a battery connected to an electronic circuit element, which controls the application of power from the battery to an attached headlight assembly containing a headlight, wherein control of the application of power to the headlight assembly is determined, in part, based on the stability of the headlight assembly.

19 Claims, 24 Drawing Sheets

Related U.S. Application Data now Pat. No. 9,791,138, which is a continuation-in-part of application No. 14/924,621, filed on Oct. 27, 2015, now Pat. No. 10,240,769.

(60) Provisional application No. 62/092,779, filed on Dec. 16, 2014.

(51) Int. Cl.
*G02C 5/02* (2006.01)
*F21Y 115/10* (2016.01)

(56) References Cited

U.S. PATENT DOCUMENTS

| | | | |
|---|---|---|---|
| 4,538,070 A | 8/1985 | Herold | |
| 5,440,462 A | 8/1995 | Kim | |
| 5,637,863 A | 6/1997 | Sanborn | |
| 5,722,762 A | 3/1998 | Soll | |
| 6,290,368 B1 | 9/2001 | Lehrer | |
| 6,443,604 B1 | 9/2002 | Rudenberg | |
| 6,461,024 B1 | 10/2002 | Becker | |
| 6,465,962 B1 | 10/2002 | Fu | |
| 6,505,951 B1 | 1/2003 | Lorenzo, Jr. | |
| 6,930,603 B2 | 10/2005 | Jackson | |
| 6,955,444 B2 | 10/2005 | Gupta | |
| 7,008,074 B1 | 3/2006 | Halm | |
| 7,115,856 B2 | 10/2006 | Peng | |
| 7,321,301 B2 | 1/2008 | Spoltore | |
| 7,604,378 B2 | 10/2009 | Wolf | |
| 7,690,806 B2 * | 4/2010 | Feinbloom | F21L 14/00 362/105 |
| 7,815,342 B2 * | 10/2010 | Medinis | F21L 2/00 362/294 |
| 7,884,733 B2 | 2/2011 | O'Dowd | |
| 8,100,552 B2 * | 1/2012 | Spero | B60Q 1/04 362/231 |
| 8,540,363 B2 * | 9/2013 | Abreu | G02C 3/003 351/74 |
| 8,851,709 B2 * | 10/2014 | Feinbloom | F21L 14/00 362/103 |
| 9,791,138 B1 * | 10/2017 | Feinbloom | F21L 4/04 |
| 10,132,483 B1 * | 11/2018 | Feinbloom | F21L 4/04 |
| 10,240,769 B1 * | 3/2019 | Braganca | F21V 23/0471 |
| 10,247,384 B1 * | 4/2019 | Feinbloom | F21V 5/008 |
| 2004/0240208 A1 | 12/2004 | Beasley | |
| 2004/0264175 A1 | 12/2004 | Willougbly | |
| 2004/0264176 A1 | 12/2004 | Vandershuit | |
| 2005/0099824 A1 | 5/2005 | Dowling | |
| 2006/0023455 A1 | 2/2006 | Hardin | |
| 2008/0205036 A1 | 8/2008 | Tarter | |
| 2008/0310145 A1 | 12/2008 | Blake | |
| 2012/0120636 A1 | 5/2012 | Wilt | |
| 2012/0275140 A1 | 11/2012 | Feinbloom | |
| 2015/0377462 A1 | 12/2015 | Wilt | |

* cited by examiner

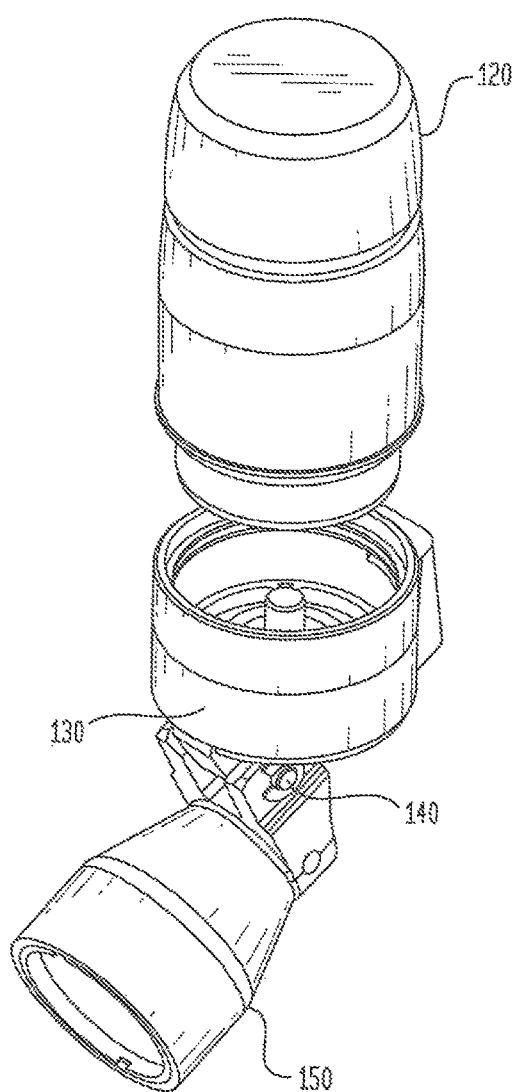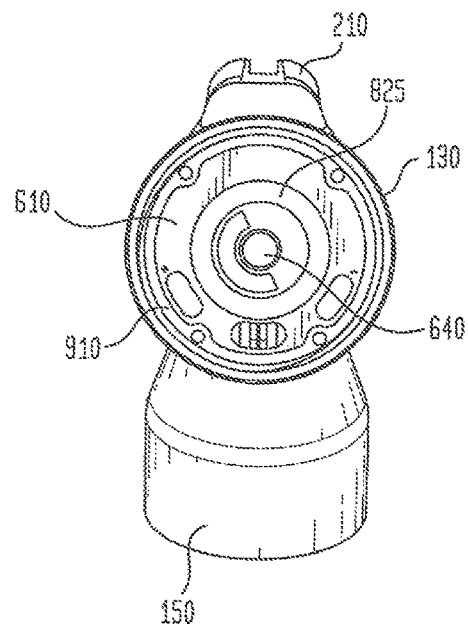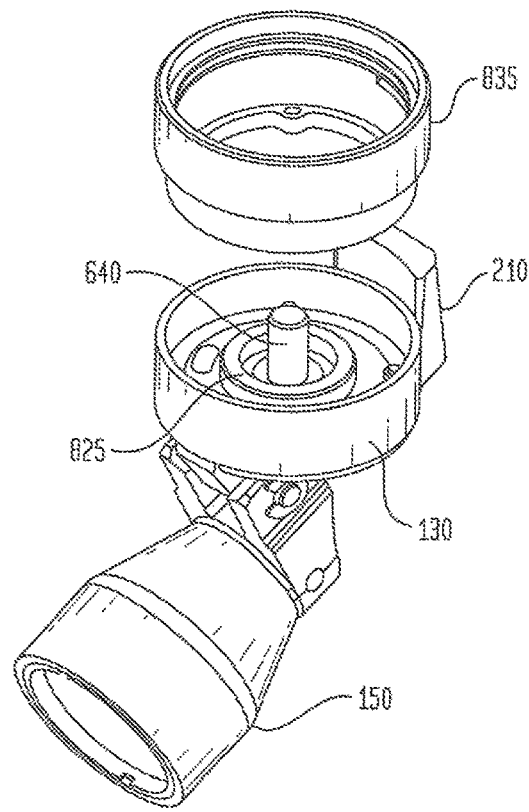

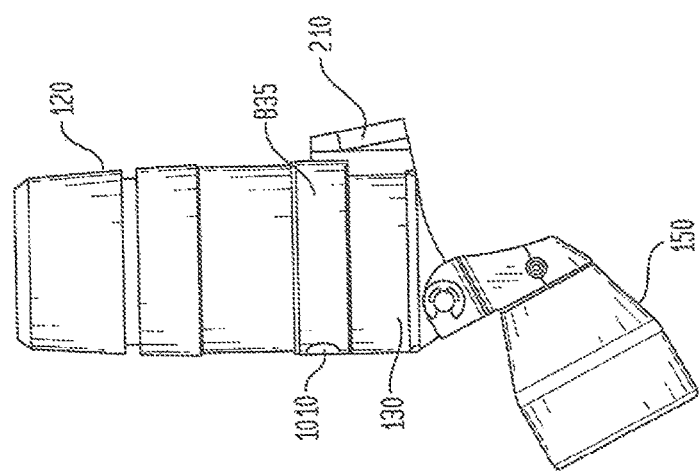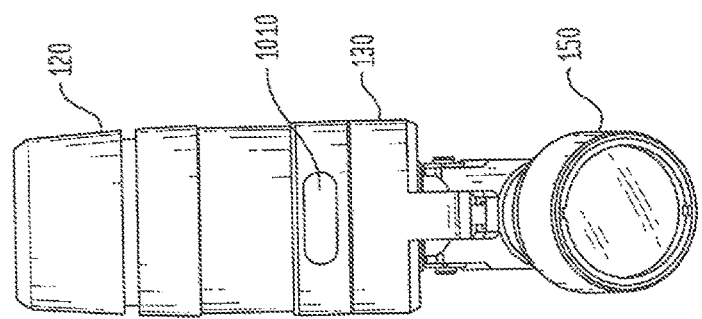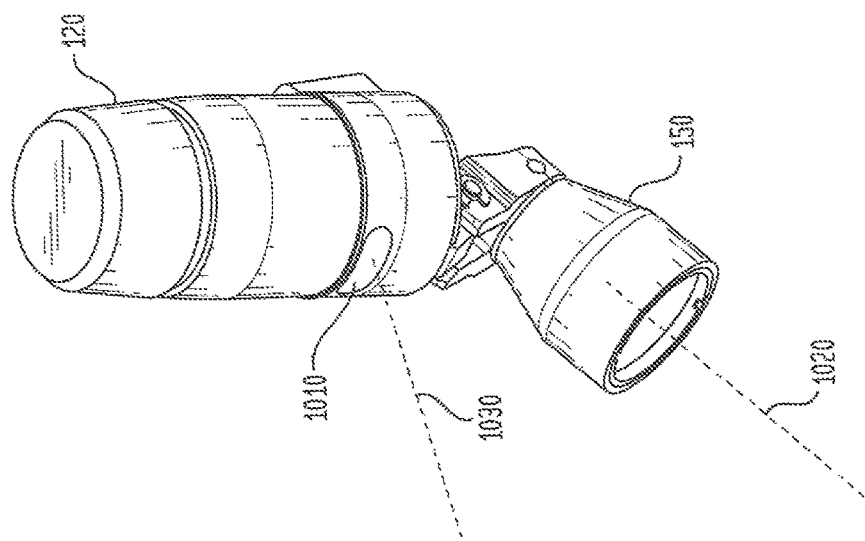

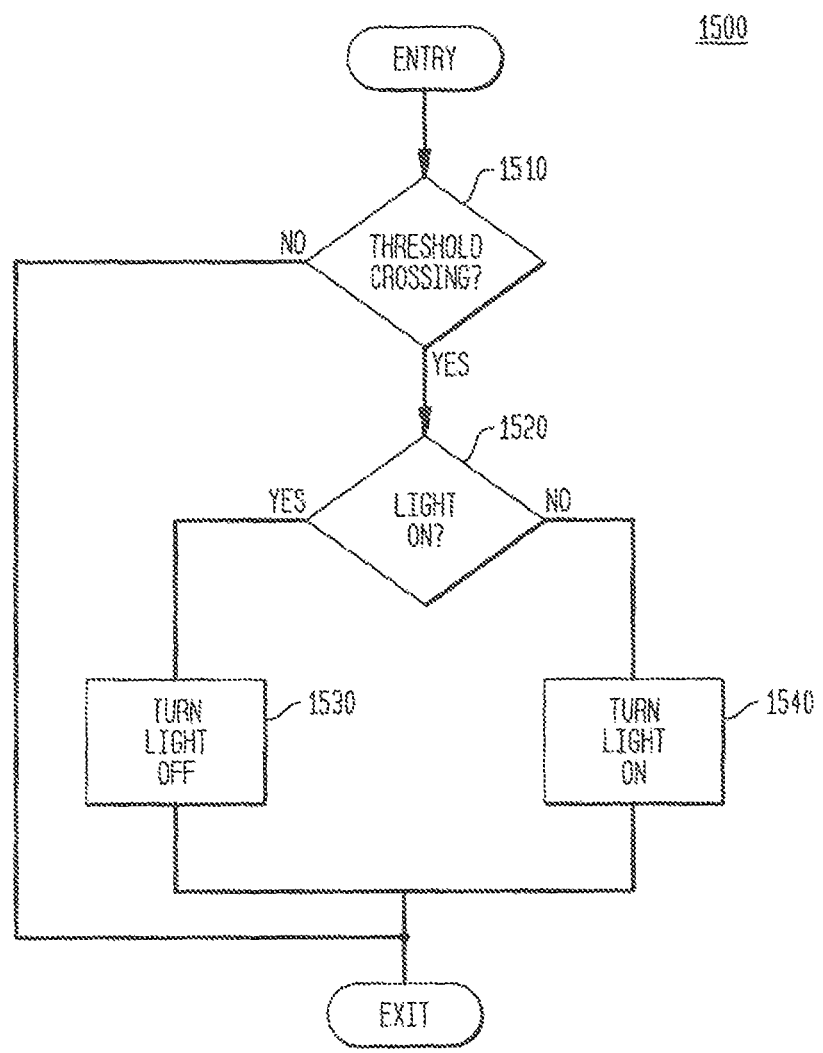

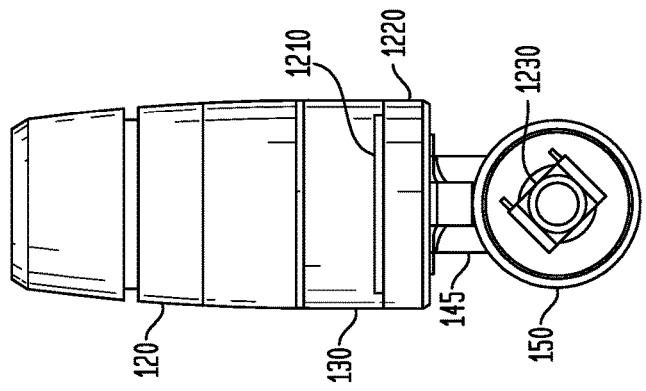
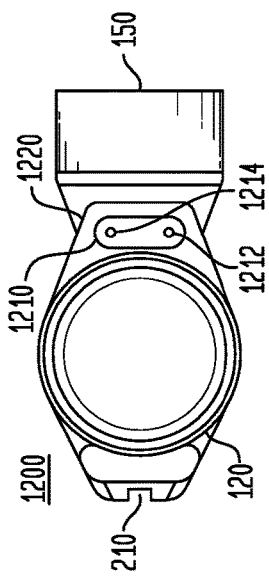
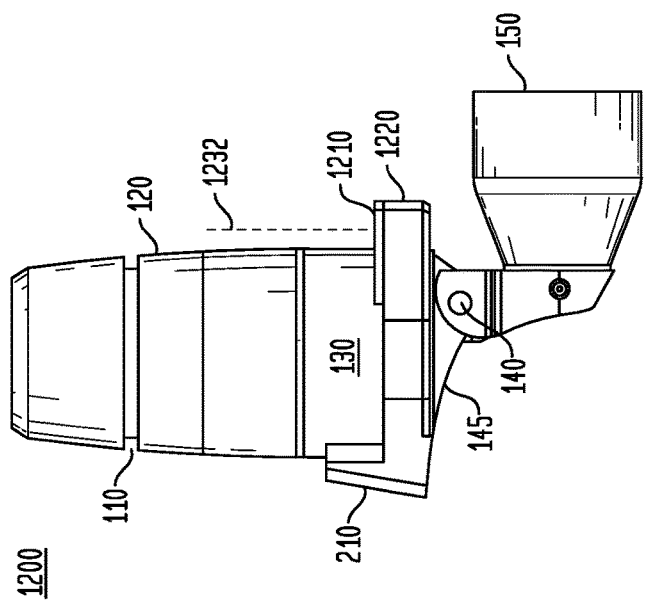

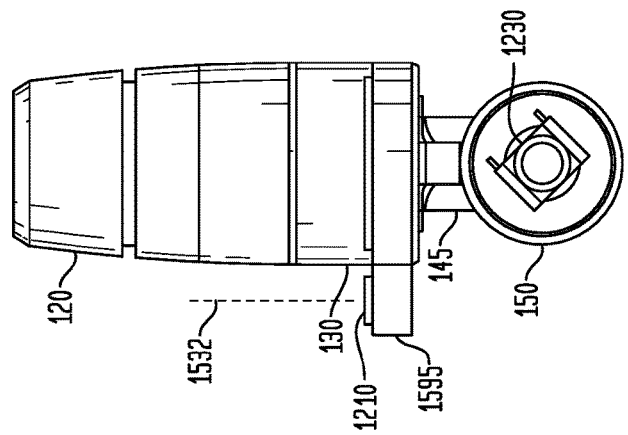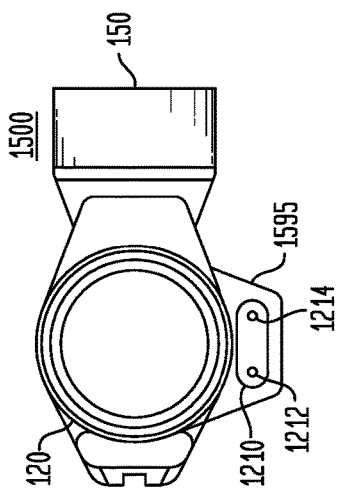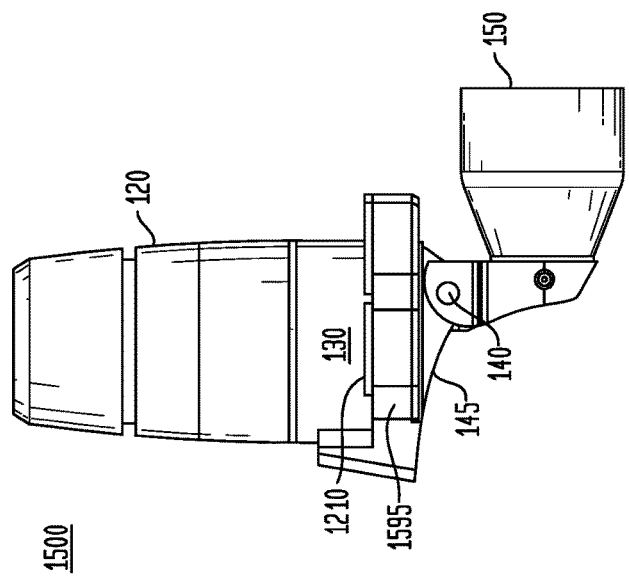

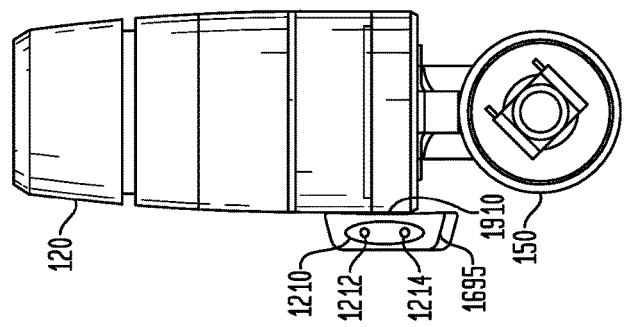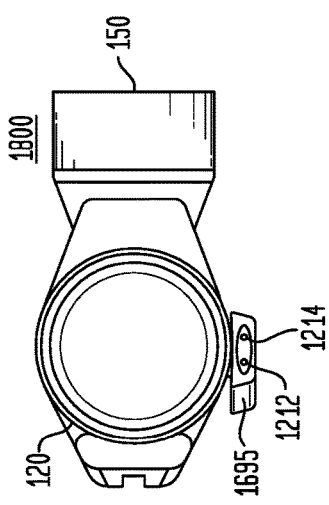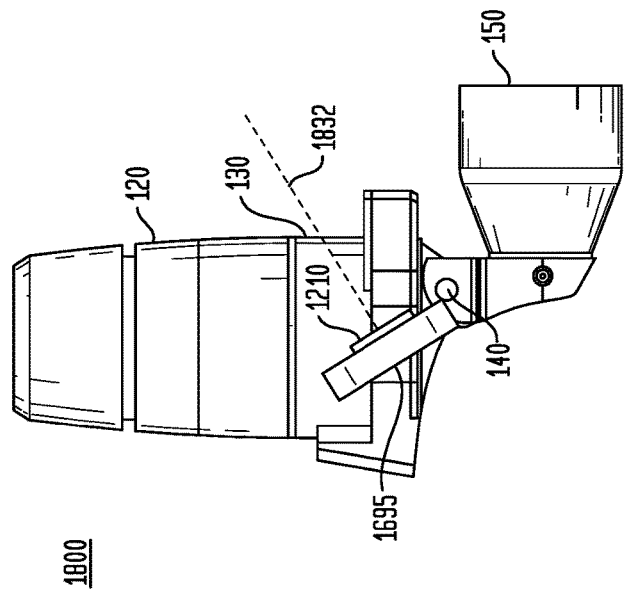

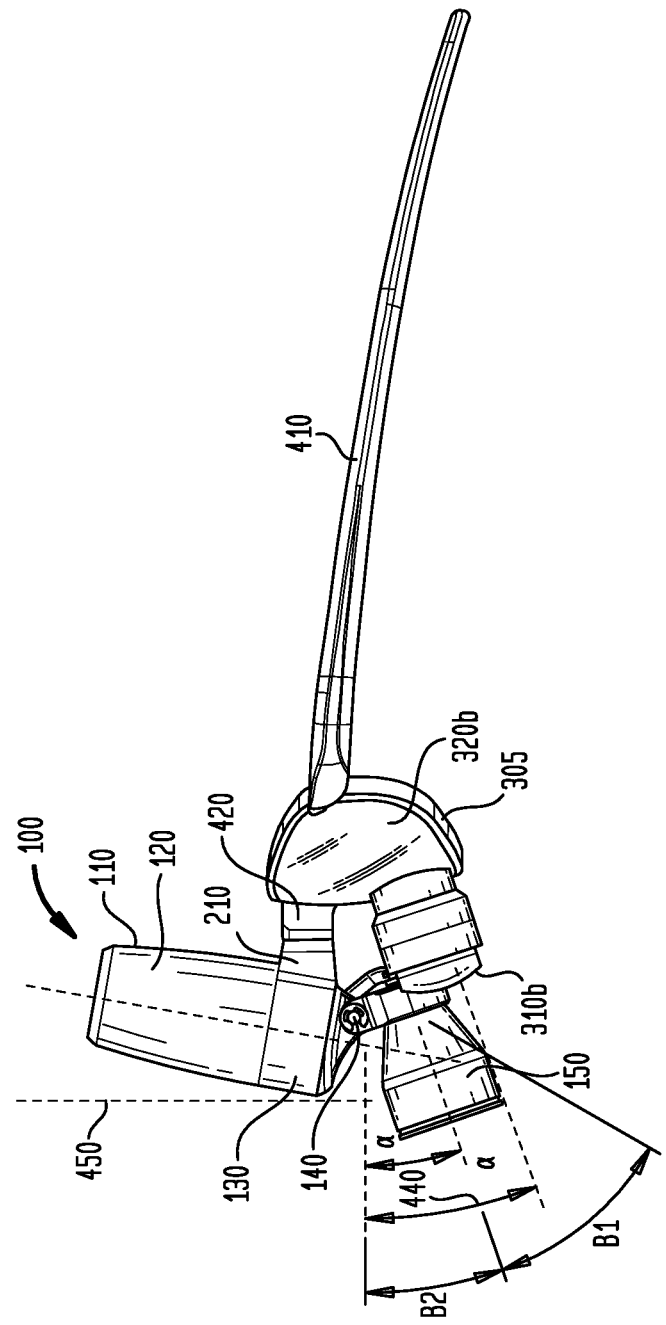

2400

CORDLESS HEADLIGHT AND CONTROL THEREOF

CLAIM OF PRIORITY

This application claims, as a Continuation-in-Part, pursuant to 35 USC 120, priority to and the benefit of the earlier filing date of that patent application filed on Sep. 28, 2018 and afforded Ser. No. 16/146,601, which claimed as a Continuation, pursuant to 35 USC 120, priority to and the benefit of, the earlier filing date of that patent application filed on Sep. 13, 2017, and afforded Ser. No. 15/703,161 (now U.S. Pat. No. 10,132,483), which claimed, as a Continuation, pursuant to 35 USC 120, priority to and the benefit of the earlier filing date of that patent application filed on Nov. 9, 2016, and afforded Ser. No. 15/347,759 (now U.S. Pat. No. 9,791,138), which claimed, as a Continuation-in-Part pursuant to 35 USC 120, priority to and the benefit of the earlier filing date of that patent application filed on Oct. 27, 2015 and afforded Ser. No. 14/924,621 (U.S. Pat. No. 10,240,769), which claimed pursuant to 35 USC 119, priority to and the benefit of the earlier filing date of, that patent application entitled "Wireless LED Headlight," filed on Dec. 16, 2014 and afforded Ser. No. 62/092,779, the contents of all of which are incorporated by reference, herein.

This application is related to patent application Ser. No. 16/209,902, filed on Dec. 4, 2018, and Ser. No. 16/209,908 (U.S. Pat. No. 10,342,543), filed on Dec. 4, 2018, both of which claimed priority, as Continuation applications, to patent application Ser. No. 14/924,621 (U.S. Pat. No. 10,240,769).

FIELD OF THE INVENTION

The instant application relates to the field of optics and more particularly to a portable illuminating device for illumination designated area, particularly in medical field.

BACKGROUND OF THE INVENTION

Professionals, such as operating doctors, dentists, hygienists, EMT, etc., require a light to provide adequate illumination to the operating filed. Having this light comes from the point of view of the user allows for shadow-free operation. The technology for providing the medical field, for example, this illumination is dominated by battery powered LED headlights. For example, U.S. Pat. No. 8,851,709, which is assigned to the Assignee of the instant application, and whose contents is incorporated by reference, herein, discloses a headlight mounted illumination device comprising a user-worn battery pack that provides electrical energy to a surgical glass headlight (see FIGS. 3 and 4, for example). This system incorporates a rechargeable battery pack with a power cord connected to a head or frame (temple) mounted LED headlight. The power cord extends from the battery pack, which may be located on a belt or shirt, for example, up towards the frame and routed along the frame towards the headlight assembly.

This current technology is cumbersome for the user as the battery pack is uncomfortable to wear and management of the power cord requires special care to avoid the cord catching on things in the working environment or interfering with the medical professionals' movement. Hence, there is a need in the industry to provide a system that provides appropriate electrical energy to the head-mounted light while eliminating the burden that the power cord introduces.

SUMMARY OF THE INVENTION

A device for providing adequate illumination to the operating field wherein the headlight is powered without the use of a power cord is disclosed.

The device comprises a removable, rechargeable, battery (e.g., lithium-ion) placed in a battery pod connected to a mounted headlight (e.g., LED).

In one aspect of the invention, the connection between the battery pod and a printed circuit board (PCB) controlling a mounted headlight may be made by a mechanical connection, including but not limited to treads, quarter-turn fastener, magnets, ball plungers, expanding collar, cam lock, coiled springs, bayonet mounts, etc. to provide simple installation and removal for recharging the contained battery.

The headlight may be activated (or deactivated) by making (or breaking) the mechanical connection to the PCB or by electrical means, wherein a switch may be controlled to electrically connect (or disconnect) the battery from the headlight.

In one aspect of the invention, an electrical connection may be made (or broken) by one or more of an RF (radio frequency) remote control, an IR (infrared) remote control, a visible remote control or sonic motion sensing control, gesturing, physical switch, Bluetooth, Wi-Fi, voice commands, etc. That is, an electrical connection may be made (or broken) in response to a request for a change in a status of the electrical connection based on receipt of one or more of a response received from an RF remote control, an IR remote control, a visible remote control, a sonic motion sensing control, gesturing, physical switch, Bluetooth, Wi-Fi or voice command.

In accordance with one aspect of the invention, a T-mount connection is made between the cordless headlight assembly and the headset or frame to which the cordless headlight assembly may be connected. In one aspect of the invention, the battery pod may be tilted at a backward angle to render a majority of the weight of the battery pod closer to the user.

In accordance with the principles of the invention, the cordless headlight may be removably mounted (e.g., T-mount connection), or fixed, to a headset or frame. In one aspect of the invention, the orientation of the cordless headlight assembly (or battery pod assembly) may be determined by its relation to the T-mount connection. In another aspect of the invention, the orientation of the cordless headlight assembly (or battery pod assembly) may be adjusted through a pivot connection.

In accordance with the principles of the invention, a headlight assembly may be connected to a battery pod assembly through a rotating hinge, mounted in a coaxial position. The rotating hinge provides for a pivotal adjustment of the headlight to adjust the light beam generated by the headlight while minimizing shadows cast by the light due to its close proximity to the user's line of sight.

In accordance with the principles of the invention, the headlight may be mounted in a forward position to provide comfort to the user by maintaining the headlight at an appropriate distance from the user.

In accordance with the principles of the invention, an internal connection between a battery in the battery pod and the headlight is advantageous as it provides more room for the user by keeping the headlight away from the user.

In one aspect of the invention, a single or dual-bay smart charging cradle may be employed that provides for rapid recharging of one or more batteries. The use of smart charging cradle allows for the continuous use of headlight operation by swapping out (and recharging) spent batteries).

In accordance with the principles of the invention a headlight assembly comprising a transmitter for transmitting a signal and a detector for detecting a reflection of the signal, is disclosed, wherein the detected reflection represents a control signal used to request a change or request an alteration of the application of a voltage to a light source within the headlamp assembly of the headlight assembly.

In accordance with the principles of the invention, a motion sensor system may be incorporated into the headlight assembly, to determine whether the headlight assembly is in a stable or in a moving condition. The determination of the motion sensor system may be used to validate whether the detected reflection of the transmitted signal is to be used to change or alter the application of the voltage to the light. Validation of the detection of the reflected signal is deemed when the motion sensor system determines the headlight assembly is in a stable condition. Otherwise, the detection of the reflected signal is inhibited from altering or changing the application of the voltage to the light source.

BRIEF DESCRIPTION OF THE FIGURES

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 8A illustrates an exploded perspective view of a second embodiment of the cordless headlight assembly in accordance with the principles of the invention FIG. 8B illustrates a top view of the battery pod connector in accordance with the second embodiment of the cordless headlight assembly shown in FIG. 8A.

FIG. 8C illustrates an exploded perspective view of the lower portion of the battery pod in accordance with the second embodiment of the cordless headlight assembly shown in FIG. 8A.

FIG. 10A illustrates a side view of a third embodiment of a cordless headlight assembly in accordance with the principles of the invention.

FIG. 10B illustrates a front view of a third embodiment of a cordless headlight assembly in accordance with the principles of the invention.

FIG. 10C illustrates a perspective view of a third embodiment of a cordless headlight assembly in accordance with the principles of the invention.

FIG. 11 illustrates a flowchart of an exemplary processing for controlling a light output of the wireless headlight assembly in accordance with the principles of the invention.

FIG. 12 illustrates a side view of a cordless headlight assembly in accordance with another embodiment of the invention;

FIG. 13 illustrates a front view of a cordless headlight assembly in accordance with the embodiment of the invention shown in FIG. 12;

FIG. 14 illustrates a top view of a cordless headlight assembly in accordance with the embodiment of the invention shown in FIG. 12;

FIG. 15 illustrates a side view of a cordless headlight assembly in accordance with still another embodiment of the invention;

FIG. 16 illustrates a front view of a cordless headlight assembly in accordance with the embodiment of the invention shown in FIG. 15;

FIG. 17 illustrates a top view of a cordless headlight assembly in accordance with the embodiment of the invention shown in FIG. 15;

FIG. 18 illustrates a side view of a cordless headlight assembly in accordance with still another embodiment of the invention;

FIG. 19 illustrates a front view of a cordless headlight assembly in accordance with embodiment of the invention shown in FIG. 18;

FIG. 20 illustrates a top view of a cordless headlight assembly in accordance with the embodiment of the invention shown in FIG. 18.

FIG. 23 illustrates a side view of an exemplary acceptance angle range in accordance with the principles of the invention.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

DETAILED DESCRIPTION OF THE INVENTION

Figure 1:
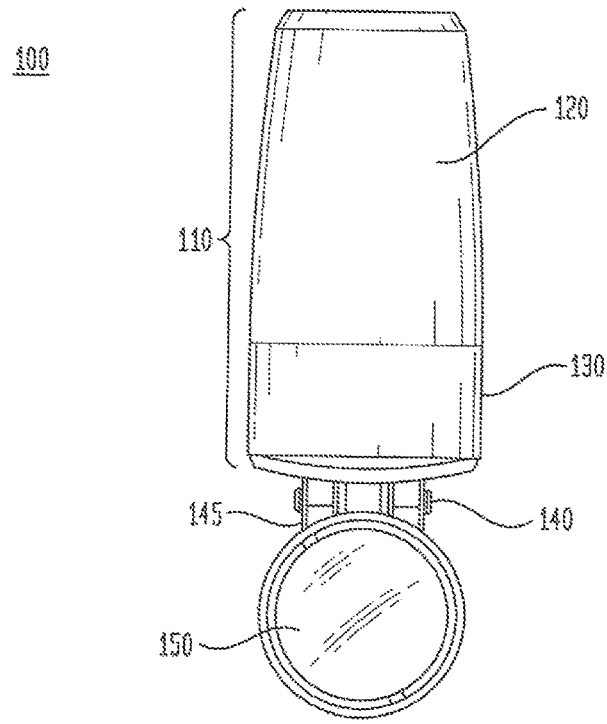
FIG. 1 illustrates a front view of exemplary embodiment of a cordless powered headlight assembly in accordance with the principles of the invention.

FIG. 1 illustrates a front view of exemplary embodiment of a cordless powered headlight assembly 100 in accordance with the principles of the invention.

In this illustrated embodiment, cordless headlight assembly 100 comprises a battery assembly 110 and a headlamp assembly 150. Battery assembly 110 is comprised of a battery pod 120 element and a lower housing or connector element 130, wherein a first end of battery assembly 110 connects or contacts lower housing 130. Battery assembly 110 is connected (pivotally) to headlamp assembly 150 at (rotatable) connector 145. Connection pin 140, inserted into connector 145, as will be further explained, provides for a pivotal rotation of headlamp assembly 150 with respect to battery assembly 110.

Figure 2:
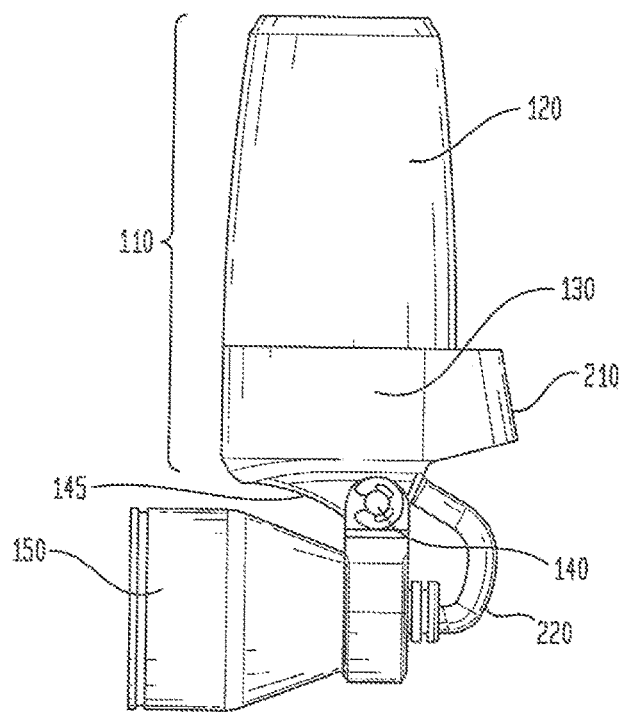
FIG. 2 illustrates a side view of exemplary embodiment of a cordless powered headlight assembly in accordance with the principles of the invention.

FIG. 2 illustrates a side view of exemplary embodiment of a cordless powered headlight assembly shown in FIG. 1.

In this illustrated embodiment, battery assembly 110 is shown connected to a distal end of headlamp assembly 150 by pin 140, which is positioned transverse to the orientation of headlamp assembly 150. Pin 140 allows adjustment of headlamp assembly 150 with respect to battery assembly 110. As would be appreciated, a set screw (not shown) or other similar retaining means may engage pin 140 through connector 145 to retain a desired orientation of headlamp assembly 150 with respect to battery assembly 110.

Also shown is connector 210, which may be used to connect cordless headlight assembly 100 to a frame or other mounting element (not shown) as will be further explained. In one aspect of the invention, connector 210 may be a T-slot connector (i.e., T-mount), which allows for the non-permanent attachment of cordless headlight assembly 100 to a frame or other mounting element.

Also shown is connector 220. Connector 220 extending from battery assembly 110 to a distal end of headlamp assembly 150 provides electrical energy to the lighting element (not shown) contained in headlamp assembly 150.

Figure 3:
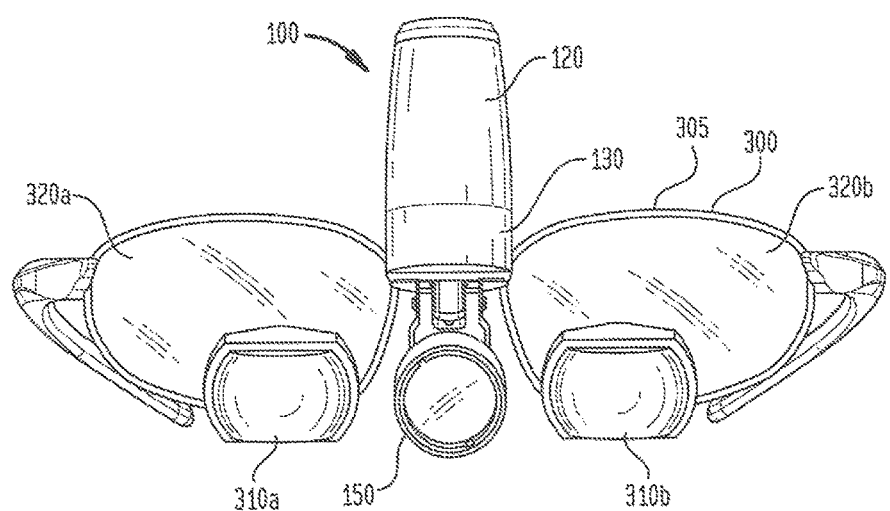
FIG. 3 illustrates an exemplary application of an exemplary cordless powered headlight assembly in accordance with the principles of the invention.

FIG. 3 illustrates a front view of an application of the exemplary cordless powered headlight assembly shown in FIG. 1.

In this illustrated embodiment, assembly 100 is attached to a frame 305 of an eyewear 300 specialized for the medical and/or dental industries. Eyewear 300 comprises left and right lens 320a, 320b, respectively. Left and right lens 320a, 320b may be ordinary glasswear or may be prescriptive glasswear or may be tinted to block or enhance desired light wavelengths. Also illustrated are telescopic lens 310a, 310b attached to corresponding left and right lens, 320a, 320b, respectively.

In one aspect of the invention, headlamp assembly 150 is oriented at a depression angle (with respect to a horizontal light through eyewear 300) similar to that of the angle of telescopic lens 310a, 310b in order to direct light to a point that is substantially convergent with a focal point of telescopic lens 310a, 310b.

Figure 4:
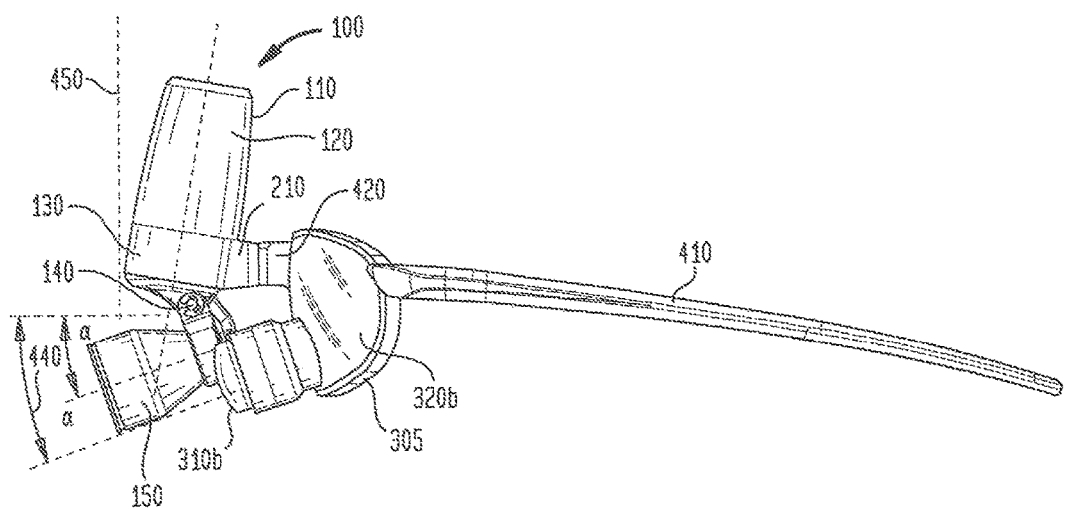
FIG. 4 illustrates a side view of an exemplary application of an exemplary cordless powered headlight assembly in accordance with the principles of the invention.

FIG. 4 illustrates a side view of an exemplary application of the exemplary cordless powered headlight assembly shown in FIG. 1.

In this illustrated embodiment, eyewear 300 includes frame 305 and temple 410. Temple 410 provides a conventional means for retaining eyewear 300 in place on a user's head.

Also, shown is mating connector 420 attached to frame 305. Mating connector 420 is positioned between lens 320a, 320b to retain cordless headlight assembly 100 substantially centered with regard to eyewear 300.

Also shown is connector 210, on cordless headlight assembly 100, attached to mating connector 420. As previously discussed connector 210 and mating connector 420 may be T-slot connectors that allow cordless headlight assembly to be removable from eyewear 300. In another aspect of the invention, connector 210 and 420 may provide for a fixed attachment, wherein the connectors 210 and 420 are a single unit.

Headlamp assembly 150 is oriented at a substantially same depression angle (a) as telescopic lens 310 (310a and 310b) with respect to horizontal axis 440. Furthermore, battery assembly 110 is shown oriented backward with respect to a line projecting substantially perpendicular 450 to horizontal axis 440. The orientation of battery assembly 110 may be determined by the relationship between the T-mount connectors 210 and 420. The angle of orientation of battery assembly 110 with respect to headlamp assembly 150 may be determined based, in part, to maintain an obtuse angle between the of headlamp assembly 150 and the battery assembly 110. In a preferred embodiment the angle of orientation of battery assembly 110 with respect to the perpendicular line 450 is in a range of 5-25 degrees.

Figure 5:
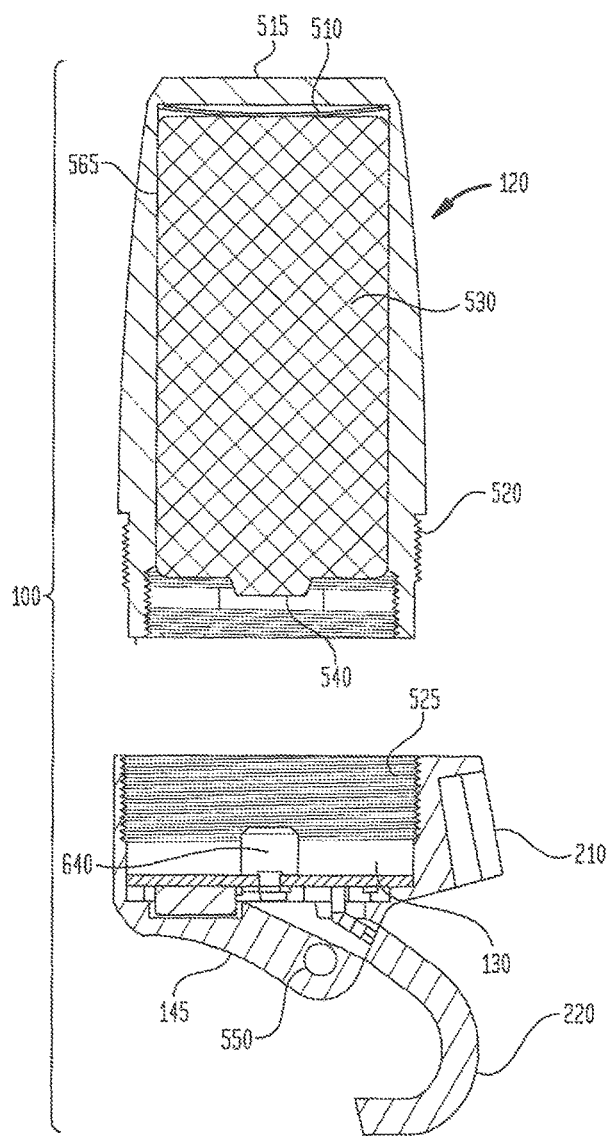
FIG. 5 illustrates an exploded side view of a battery pod in accordance with the principles of the invention.

FIG. 5 illustrates an exploded side view of battery assembly 100 in accordance with the principles of the invention.

In this illustrated embodiment, battery 530 is contained within battery pod 120. Battery pod 120 includes, at its second end, a dome spring cover 515 that covers spring 510. Dome spring cover 515 may be a flexible covering (e.g., rubber, thin metal or plastic) that allows for deformation of spring cover 515. At the nadir of the deflection of spring cover 515, cover 515 engages spring 510. Spring 510 may represent a conventional spring loaded on-off type switch which is rendered in a first position upon a first engagement with cover 515 and is rendered in a second position upon a second engagement with cover 515. In this illustrated embodiment, spring 510, which has a concave shape, operates as a switch to contact a first end of battery 530 contained within battery pod 120 when spring 510 is in a first position and may not contact the first end of battery 530 when spring 510 is in a second position.

Also illustrated are treads 520 circumscribing an end of battery pod 120. Treads 520 provide a means for battery pod 120 to engage housing or connector element 130. Threads 520 further are electrically connected to the first end of battery 530 when spring 510 is in a position to contact the first end of battery 530. Threads 520 may be electrically connected to first end of battery 530 by an electrical connector 565 that extends from spring 510 to threads 520 alongside battery 530.

In one aspect of the invention, a first depression of spring cover 515 causes spring 510 to engage the first end of battery 530 to provide an electrical path to threads 520 through connector 565. wherein a second depression of spring cover 515 causes spring 510 to disengage the first end of battery 530 causing threads 520 to be electrically isolated from battery 530.

Further illustrated is center electrode 540 of battery 530 located at a second end of battery 530. As is understood in the conventional field of battery technology, the first end of battery 530 may represent a negative potential or charge and the center electrode 540 of the second end of battery 530 may represent a positive potential or charge.

Although, battery 530 is shown having a negative charged first end, it would be recognized that the orientation of battery 530 within battery pod 120 may be altered without altering the scope of the invention. In this case, a corresponding change in wiring provides for the proper electrical polarity to the lighting element (not shown).

Also shown is housing or connector element 130 and connector 145. Within, and transverse to, connector 145 is pass-through 550. Pass through 550 allows pin 140 to connect housing element 130 to headlamp assembly 150, as previously discussed. Rotation of headlamp assembly 150 about pin 140 provides for a change in orientation of headlamp assembly 150 with respect to housing element 130 and battery pod 110.

Also shown, within housing element 130 are screw threads 525. Screw treads 525 engage threads 520 to connect battery pod 120 to housing element 130. In addition, treads 525 provide an electrical connection between pod 120 (when treads 520 are negatively charged, for example) to allow electrical energy to flow through connectors 220 to headlamp assembly 150 (not shown).

Accordingly when cover 515 is depressed a first time, electrical energy is provided to the headlamp assembly 150 and a second depression of cover 515 removes electrical energy from the headlamp assembly 150.

In another aspect of the invention, spring 510 may be permanently retained in the first position wherein spring 510 engages one end battery 530, such that connection of battery cover 120 through threads 520 and 525 cause electrical flow to headlamp assembly 150.

In a further aspect when battery cover 120 is composed of an electrically conductive material (e.g., aluminum) then battery cover 120 provides an electrical path for electrical to threads 520.

Figure 6:
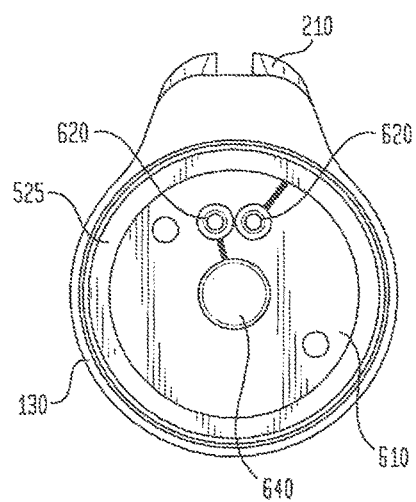
FIG. 6 illustrates a top view of the battery pod connector in accordance with the principles of the invention.

FIG. 6 illustrates a top view of the housing element 130 in accordance with the principles of the invention.

In this illustrative embodiment, center electrical connector 640 represents a connection point that enables the electrical potential on center electrode 540 of battery 530 to pass through to a printed circuit board 610. The printed circuit board 610 includes circuitry (hardware; dedicated or specialized) that controls the passage of electrical energy to the headlight (not shown) in headlamp assembly 150. Also shown are wire connectors 620, through which electrical energy is passed from printed circuit board 610 to headlight housing 150.

Figure 7:
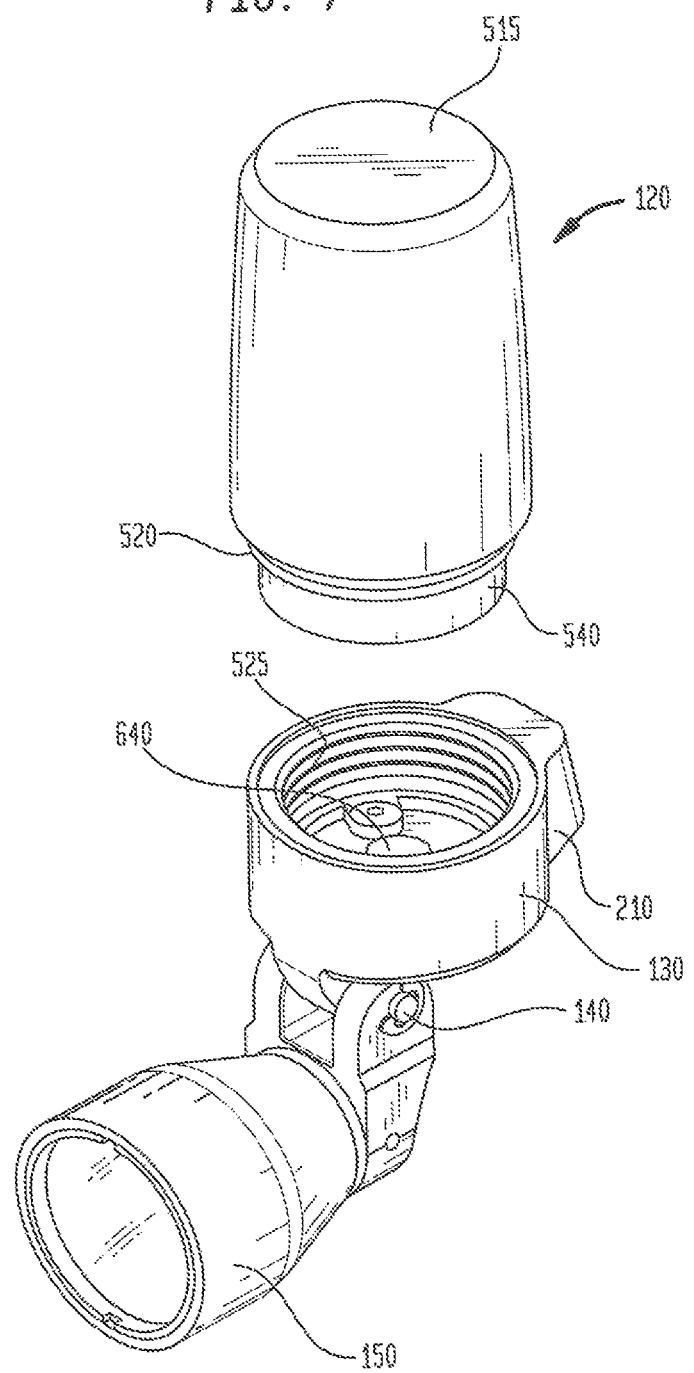
FIG. 7 illustrates an exploded perspective view of the cordless headlight assembly in accordance with the principles of the invention.

FIG. 7 illustrates an exploded perspective view of the cordless headlight assembly in accordance with the principles of the invention.

As illustrated, battery pod 120 may engage housing element 130 by screwing pod 120 into housing element 130. Center connector 640 engages center probe 540 when pod 120 is completely screwed into housing element 130.

Although it has been discussed that screw threads 520 engage screw threads 525 to connect pod 120 to housing element 130, it would be recognized that the means to engage pod 120 with housing element 130 may be selected as one of: a bayonet connection, a quarter-turn locking connection, a snap-in connection, etc. in place of a screw thread connection illustrated.

FIG. 8A illustrates a perspective view of a second embodiment of the cordless headlight assembly in accordance with the principles of the invention.

In the illustrated embodiment shown in FIG. 8A, battery pod 120 engages a housing or connector element 130, as previously described. Battery pod 120 may engage housing or connector element 130 by means of a screw thread attachment, a slip joint attachment, a bayonet attachment, etc., as previously discussed.

FIG. 8B illustrates a top view of the lower portion of the battery pod in accordance with the second embodiment of the cordless headlight assembly shown in FIG. 8A.

In this illustrated second embodiment, an inner positive ring or center contact 640 (as previously discussed) and an outer negative ring 825 are shown. Positive ring or center contact 640 engages a positive terminal of a battery element (not shown but similar to battery 530 shown in FIG. 5) and negative ring 825 engages a negative terminal of the battery element. In this case, battery element (not shown) is formed in a manner wherein the positive and negative terminals of the battery element are presented on one end of the battery element. The construction of battery element in this manner is similar to the construction of a conventional 9 volt battery, wherein the positive and negative terminals are contained on a single surface of the battery.

FIG. 8C illustrates an exploded perspective view of the connector 130 in accordance with the second embodiment of the cordless headlight assembly 100 shown in FIG. 8A.

In this illustrated embodiment, a metal ring 835 provides a capacitive touch switch assembly, to operate the headlight contained in headlamp assembly 150. In this illustrated embodiment, metal ring 835 contacts the PCB 610 through a contact ring 910 (see FIG. 8B) when the battery pod 120 engages connector 130

In accordance with the principles of the invention, the PCB 610 monitors the metal ring 835 for a change in capacitance. In one aspect of the invention, when a change of capacitance is recognized (e.g., a finger touch to metal ring 835) power to the headlight in headlamp assembly 150 may be at a maximum (full light intensity). Upon recognition of a next change in capacitance, the power applied to the headlight in headlamp assembly 150 may be reduced to provide a lower light intensity output. A further touch may cause the headlight to be turned off. (e.g., removal of the power from the headlight).

Figure 9:
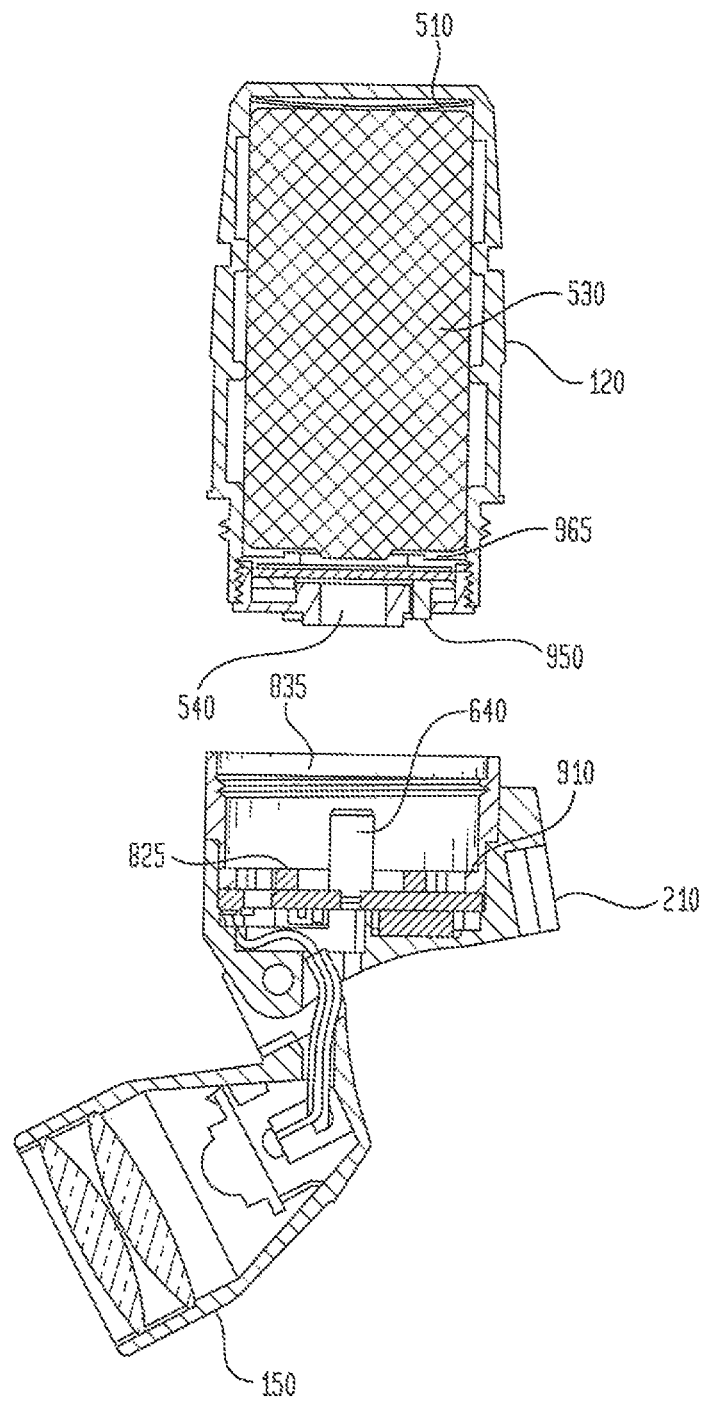
FIG. 9 illustrates a side view of a cordless headlight assembly in accordance with the principles of the invention.

FIG. 9 illustrates a side view of the second embodiment of the wireless headlamp assembly 150 in accordance with the principles of the invention.

In this illustrated embodiment, positive contact 640 and negative ring 825 contact respective positive terminal 540 and negative terminal 950 of battery element 530. Further illustrated is contact ring 835 engaging capacitive ring 910 engaging PCB 610 (not shown).

Further shown is dome spring 510, previously described, and disk spring 965. The use of one or both of dome spring 510 and disk spring 965 is advantageous as the flexible material of the springs (e.g., metal spring, resilient material) retains the positive and negative terminals, 540, 950, respectively, of battery element 530 in contact with corresponding positive terminal 640 and negative ring 825. As would be appreciated, disc spring 965 may represent individual conductive or non-conductive elements positioned circularly between positive contact 640 and negative ring 825. Similarly, disc spring 965 may represent a conductive or a non-conductive resilient material circular element positioned between the positive contact 640 and negative ring 825. Similarly, the disc spring 965 may be an conductive or non-conductive resilient material positioned outside of the negative ring 825.

FIG. 10A illustrates a side view of a third embodiment of a cordless headlight assembly in accordance with the principles of the invention.

In the illustrated embodiment, which is similar to the embodiment shown in FIG. 8A, a translucent window 1010 is created in metal ring 835 (or connector 130). Translucent window 1010 allows for the output of a light (e.g., infra-red, visible), an audio signal and/or an radio frequency (RF) signal that may be used to provide for a contactless switching mechanism in a manner similar to that discussed in U.S. Pat. No. 8,851,709, which is assigned to the owner of the instant application and incorporated by reference herein.

FIG. 10B illustrates a front view of a cordless headlight assembly shown in FIG. 10A showing the translucent window 1010.

FIG. 10C illustrates a perspective view of the cordless headlight assembly shown in FIG. 10A, showing an axis 1030 of the outputted light (Infra-Red (IR), visible and/or ultra-violet (UV), audio and/or RF signals and an axis 1020 of headlamp assembly 150.

As shown the output of infra-red light, for example, through translucent window 1010 is essentially horizontal (see axis 440, FIG. 4).

As discussed with regard to U.S. Pat. No. 8,851,709, the light output of the headlight (not shown) in headlamp assembly 150 may be controlled by movement of a hand or object in front of translucent window 1010.

FIG. 11, herein, which corresponds to FIG. 15 of U.S. Pat. No. 8,851,709, illustrates an exemplary processing for controlling the application of electrical energy to cordless headlamp assembly 150 shown in FIG. 10A-10C for example.

As shown, at block 1510, a determination is made whether a reflected light, for example, crosses a threshold value. If not, processing exits. However, if the reflected light is above the threshold value, then a determination is made whether the headlight is in an ON condition or an OFF condition (block 1520). If in the ON condition, then the headlight is turned off (block 1530) and if in the OFF condition then the headlight is turned on (block 1540). Thus, the electrical energy may be applied to (or removed from) the headlight in stages. The number of stages is determined by a desired granularity of the application of the electrical energy. FIG. 11 illustrates a coarse granularity of ON and OFF.

Processing similar to that shown in FIGS. 16-18 of referred to U.S. Pat. No. 8,851,709 are incorporated, by reference, into the headlight assembly disclosed, herein, to operate the headlight in the accordance with the principles of the invention. That is, the level of intensity granularity may be variable in the form of increasing or decreasing the output illumination by varying the application, or removal, of the battery provided voltage. In the illustrated FIGS. 16-18, the battery voltage (and/or intensity) may be altered in a linear manner.

FIG. 12 illustrates a side view of a cordless headlight assembly 1200 in accordance with another embodiment of the invention.

In accordance with this embodiment of a touchless headlight assembly 1200, the headlight assembly 1200 comprises a battery assembly 110, including battery pod 120, that is removably attached to a housing (connector, lower assembly) 130, as previously described with regard to FIG. 10A. for example. As previously discussed, a battery (not shown) is incorporated into battery pod 120. The battery may be a rechargeable battery, (e.g., lithium-ion) or an alkaline battery. Similarly, a headlamp or headlight 150 is pivotally attached to the lower assembly 130 by connector 145 through connector pin 140. As previously discussed, connection pin 140, inserted into connector 145 provides for a pivotal rotation of headlamp assembly 150 with respect to battery assembly 110 (i.e. battery pod 120 and lower assembly 130, see FIG. 1). As would be appreciated, the orientation of the headlamp assembly 150 and the battery assembly 110 may be held in place by a locking screw (not shown). That is, in one aspect of the invention, connection pin 140 may be replaced with a locking nut/screw assembly that incorporates a threaded connection to allow the user to tighten the headlamp assembly 150 about connector 145 to retain the headlamp assembly 150 in a fixed position with respect to the lower assembly 130. In this aspect of the invention, the nut may be retained in a sleeve, for example, to prevent rotation of the nut as the screw is rotated clockwise. Thus, rotation of the screw applies a pressure on the connection 145 of the lower assembly 130 to retain the lower assembly 130 and the headlamp assembly 150 in a fixed position. In addition, in one aspect of the invention, the nut element used in the locking nut/screw assembly may be a reverse threaded nut. The use of a reverse thread (commonly referred to as a left hand thread) is advantageous to prevent accidental loosening of the screw by continuous counter-clockwise rotation of the screw element.

Also shown is connector 210, which may be used to connect cordless headlight assembly 1200 to a frame or other mounting element (not shown) as will be further explained. In one aspect of the invention, connector 210 may be a T-slot connector (i.e., T-mount), which allows for the non-permanent attachment of cordless headlight assembly 1200 to a frame or other mounting element.

Battery pod 120 may be connected to the lower assembly 130, as previously described with regard to FIGS. 5-9 and need not be repeated herein. Similarly, a voltage from the battery (similarly to battery 530, FIG. 5) included within the battery pod 120 may be provided through a printed circuit board (see FIG. 6, 610) in lower assembly 130 containing the electronic circuit (or system) 2130. The printed circuit board 610 includes circuitry (hardware; dedicated or specialized) that controls the passage of electrical energy (i.e., power, voltage or current) to the light source (not shown) in headlamp assembly 150.

Further shown is ledge 1220 that extends from the lower assembly 130. Ledge 1220 provides an area for the placement of a sensing device 1210 that may be used to control the application of a voltage from the battery when the battery pod 120 is engaged with the lower assembly 130. That is, the ledge 1220 provides for the placement of the sensing unit at an orientation in a non-conventional manner (i.e., pointing upward). Sensing device 1210 operates as a switch in the electronic circuit that allows for the application, or the removal, of the battery provided voltage to the light source within the headlamp assembly 150 of headlight assembly 100. Alternatively, the sensing unit 1210 may generate a signal, which when received by the electronic circuit operates a switch that allows for the application, the removal, of the battery provided voltage to the light source within the headlamp assembly 150 of headlight assembly, and/or the gradual application/reduction of the battery provided voltage to the light source. As would be appreciated, the gradual application of the battery provided voltage increases the illumination output of the light source (or element), while the gradual removal or reduction of the battery provided voltage decreases the illumination output of the light source. In one aspect of the invention, a first detection of a reflected signal may turn the at least one lighting element to an "ON" state, wherein a full voltage of the battery is applied to the lighting element so that a maximum illumination is achieved. In a second detection of a reflected signal, the voltage applied to the at least one lighting element may be reduced to a known value (e.g., 50% maximum voltage) in order to dim the illumination output. And a third detection of a reflected signal may cause the voltage from the battery to be removed from the at least one lighting element. In this case, the light element is set to an "OFF" state.

Sensing device 1210 comprises a transmitter 1212 that is configured to transmit a signal with respect to an axis (see FIG. 4) of the battery pod 120. For example, as previously discussed, the battery pod may be oriented between a range of 5 to 25 degrees with respect of a substantially vertical axis. In one aspect of the invention, the angle of the sensing device 1210 is determined based on the relationship of the ledge to the axis of the battery pod 120. Thus, the sensing device 1210 may transmit a signal that is substantially parallel to the axis of the battery pod or at a second angle (e.g., vertically) taken with respect to the axis of the battery pod. Shown in FIG. 12 is an exemplary axis 1232 of the outputted light (Infra-Red (IR), visible and/or ultra-violet (UV), audio and/or RF signals. Sensing device 1210 further comprises a receiver (or detector) 1214 configured to receive (or detect) a reflection of the transmitted signal. The reflection of the transmitted signal may be caused by an object moving across the path of the transmitted signal. As discussed with regard to FIG. 11, for example, the detection of a reflection of the transmitted signal may be used to alter the state of the light source contained within the headlamp assembly 150. For example, a detection of a reflection of the transmitted signal by the detector may be used to turn the light source OFF (i.e., remove the applied battery voltage from the light source) when the light is on or may be used to turn the light source on (i.e., allow the battery voltage to be applied to the light source) when the light is off. Sensing device 1210 may be placed on top of the area defined by the extension or ledge 1220. Alternatively, sensing device 1210 may be incorporated into ledge 1220 wherein the transmitter 1212 transmits and the receiver 1214 receives signals through a translucent or clear window (i.e., optically transparent). Containing the sensing device 1210 within the lower assembly is advantageous as it prevents damage to the transmitting and receiving elements.

FIG. 13 illustrates a front view of a cordless headlight assembly 1200 in accordance with the principles of the invention. In this illustrated view, the light source 1230 is shown positioned with the headlamp assembly 150. Although a single LED 1230 is shown, it would be appreciated that the LED 1230 may comprise one or more LEDs. For example, the LED 1230 may represent a plurality of LEDS arranged in an array or in a circular arrangement, for example.

FIG. 14 illustrates a top view of a cordless headlight assembly 1200 in accordance with the principles of the invention. In this illustrated view, the transmitter 1212 and the receiver 1214 within sensing element 1210 are depicted. The sensing element 1210 is positioned within area 1220, which causes the signal transmitted by transmitter 1212 to travel along axis 1232, which in this exemplary illustration is shown to be substantially parallel to the battery pod 120.

Detector (i.e., receiver) 1214 is configured to detect a reflection of the signal transmitted by the transmitter 1212 caused by an object moving across the path of the transmitted signal. As would be appreciated, the strength of the reflected signal is based on the strength of the transmitted signal and a distance of the object from the transmitter. Thus, to avoid errors in determining whether a detected signal is a valid signal, a magnitude of the detected signal may be compared to a threshold value. If the magnitude of the detected signal is greater than the threshold value, the detected signal is considered valid and the voltage to the battery may be altered in response to the detected signal. Otherwise, if the magnitude of the detected signal is less than the threshold voltage, no action is taken (see FIG. 11, for example).

The threshold value may be determined based on an expected transmitting signal power and an allowable distance from the sensing element 1210. That is a greater transmitting signal power allows for a greater allowable distance. In another aspect of the invention, a second magnitude threshold may be incorporated. In this case, when the magnitude of the detected signal is greater than the second threshold, the detected signal is determined to be invalid, as the distance of the object to the transmitter is too close. In this aspect of the invention, the object causing the reflection of the transmitted signal is required to be within a distance range from the transmitter that causes the magnitude to the detected signal to be within a range (or window) determined by the first threshold and second thresholds. In a preferred embodiment the distance range is approximately three (3) to six (6) inches from the transmitter 1212 of acceptable signals. As would be recognized the threshold values may be determined based on the transmitted power and the expected power of the detected signal to be received from an object within an acceptable distance range.

In another aspect of the invention, the threshold value may be determined as a time difference between a time of the transmitted signal and a time of the detected reflection of the signal. In this case, if the time difference is less than the threshold value, the detected signal is deemed valid; whereas, if the time difference is greater than the threshold value, the detected signal is deemed invalid and no action is taken as previously discussed.

In another aspect of the invention, the threshold value may comprise a magnitude and a time difference, wherein a time difference between the transmission of the signal and the detection of the signal is greater than a first time threshold and greater than a magnitude threshold value, the detected signal may be deemed valid and an alteration of the voltage applied to the light source 1230 is performed.

FIGS. 15-17 illustrates a side view, a front view and a top view, respectively, of a cordless headlight assembly 1500 in accordance with still another embodiment of the invention.

FIG. 15 illustrates a side view of the cordless headlight assembly 1500 which is similar to the assembly 1200 shown in FIG. 12 In this illustrated case, sensing unit 1210 is positioned to a side of battery pod assembly 120. FIG. 16 illustrates a front view of the cordless headlight assembly 1500 which is similar to the assembly 1200 shown in FIG. 12. In this illustrated view an extension or projection 1595 along a side of the lower assembly 130 is shown. Further illustrated is sensing element 1210 positioned on a surface of the projection or ledge 1595 wherein a direction 1532 of the outputted light (Infra-Red (IR), visible and/or ultra-violet (UV), audio and/or RF signals is also shown. FIG. 17 illustrates a top view of the cordless headlight assembly 1500 showing sensing unit 1210, including transmitter 1212 and receiver 1214 positioned within the projection 1595. The elements of FIGS. 15, 16 and 17 are similar to the elements of FIGS. 12, 13 and 14, respectively, and need not be discussed in detail again. Rather, one skilled in the art would understand operation of the embodiment shown in FIGS. 15, 16, and 17 in view of the disclosure provided from FIGS. 12, 13 and 14.

FIGS. 18, 19 and 20 illustrate a side view, a front view and a top view of a cordless headlight assembly in accordance with a still further embodiment of the invention;

FIG. 18 illustrates a side view of a cordless headlight assembly 1800 which is similar to the headlight assembly shown in FIG. 15. Hence, the details regarding the operation of the embodiment shown in FIG. 18 is similar to that of FIGS. 12 and 15 and it would be within the skill of the practitioners in the art to understand the operation of the embodiment shown in FIG. 18 with reference to the discussion provide with regard to FIG. 12, for example.

In this illustrated embodiment, the projection or ledge 1695 containing the sensing unit 1210 may be rotated about a rotary hinge 1910 (see FIG. 19) so as to position the sensing unit 1210 in a desired position. Also shown is an axis 1832 of the outputted light (Infra-Red (IR), visible and/or ultra-violet (UV), audio and/or RF signals transmitted by transmitter 1212. FIG. 20 illustrates a top view of a cordless headlight assembly in accordance with a fourth embodiment of the invention. In this illustrate case, the transmitter 1212 and the receiver 1214 are shown in a position similar to that of FIG. 17. However, it would be recognized that in this embodiment, the orientation of the transmitter 1212 and the receiver 1214 may be rotated from one of transmission of a single substantially parallel to an axis of the battery pod assembly to one of substantially perpendicular to an axis of the battery pod assembly.

Although not shown, it would be recognized that the rotatable hinge 1910 may include a plurality of fixed positions to which the sensing unit 1210 may be set. The fixed positions may be established by one or more detents. For example, the detents may comprise a ball on one side of the rotatable joint 1910 and a plurality of cups on the other side of the rotatable joint 1910. The retention of the ball in one of the plurality of cups retains the sensing unit in the corresponding position.

The ability to rotate the sensing element 1210 is advantageous as it allows the user to position the sensing unit to avoid high levels of background lighting caused by overhead lighting while avoiding false detects as a user approaches an object.

Figure 21:
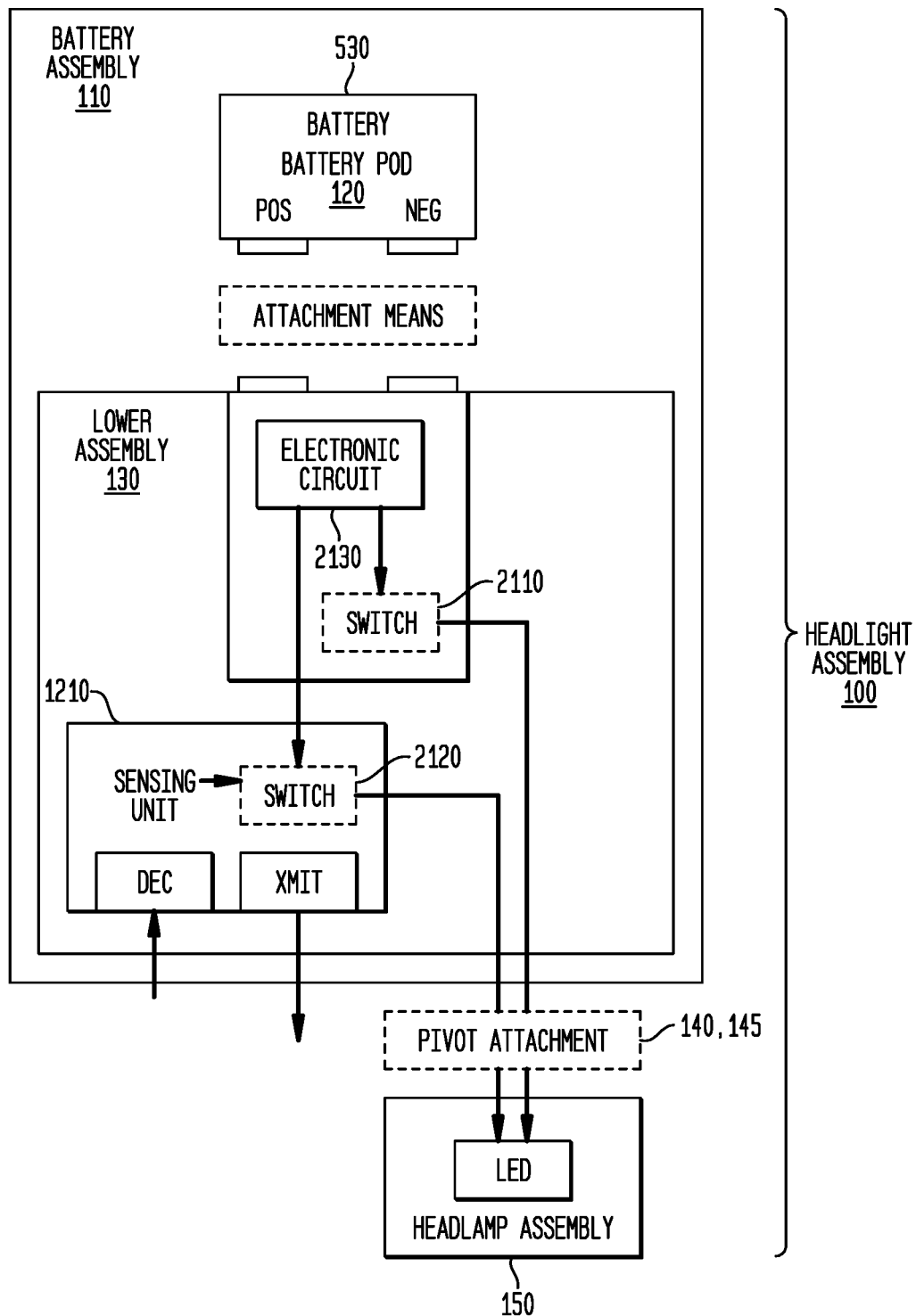
FIG. 21 illustrates a block diagram of an exemplary electronic circuit configuration in accordance with the principles of the invention.

FIG. 21 illustrates a block diagram of a first embodiment of the invention claimed, wherein the battery assembly 110 includes a battery 530 (see FIG. 5) that is removably attached to a lower assembly 130, which includes PCB 610 (see, e.g., FIG. 6) including electronic circuit 2130. Electronic circuit 2130 receives power (or voltage) from the battery 530 when the battery pod 120 is attached to the lower assembly 130, as previously discussed. Further shown is the sensing unit (e.g., 1210) including a detector (receiver, Dec) and a transmitter (Xmit). The transmitter, as previously discussed may generate and output a signal with a relatively significant power, whereas the detector may receive a significantly reduced power reflected signal. The power (or amplitude) of the detected signal is dependent upon the output power of the transmitted signal and a distance an object crossing the path of the transmitted signal is from the transmitter.

In response to the detection of the reflected signal, which may be further validated, a control signal (represented as a thin line, wherein the arrow-head shows the direction of the communication flow) may be provided to electronic circuit 2130.

Also illustrated is switch 2110, which may be incorporated into electronic circuit 2130 or may be a separate element. Switch 2110 receives power (represented by a broad line) through the electronic circuit 2130, for example, through a by-pass circuit, wherein the voltage of the battery 530 is available at an input of the switch 2110. Switch 2110 further receives a control signal (represented by a thin line), which controls the position of the switch 2110. In one aspect, electronic circuit 2130, in response to a control signal from the detector may output a control signal to switch 2110 to direct power to be provided to the LED in headlamp assembly 150. Alternatively, the control signal output to switch 2110 may direct switch 2110 to inhibit power from being provided to the LED. That is, remove power from the LED contained within the headlamp assembly 150.

In a further refinement of the processing of the electronic circuit 2130, a degree of illumination may be achieved by the variation of the power to LED. For example, electronic circuit 2130 may determine a magnitude of the received reflected signal and output a different power level to LED so as to change the output illumination of the LED. In another aspect, the electronic circuit 2130 may determine a change in magnitude of the reflected signal. For example, increasing magnitude as the object reflecting the transmitted signal moves closer to the transmitter. In this case, the power output to the LED may be varied based on the increased reflected signal magnitude to increase the output illumination of the LED. Similarly, the output illumination of the LED may be decreased as the object moves away from the transmitter. In still another aspect of the invention, the power output level to the LED may be varied based on a length of time the reflected signal is determined to be present. That is, the output illumination of the LED may be increased (by increasing the power output to the LED) based on a length of time the reflected signal is present. In still another aspect of the invention, a color output of the LED may be varied when the length of time the reflected signal is present is greater than a threshold value. For example, the LED may be composed of a plurality of nominally white LEDs and nominally non-white (e.g., yellow, blue, green, red) LEDS. In one aspect of the invention, power may be applied only to those LEDs having a nominally white light output.

However, if the reflected signal is determined to be present for at least a predetermined time (i.e., greater than a threshold value), then power is removed from the white LEDs and applied only to the non-white LEDs. In this configuration a dentist, for example, may use the white LEDs for examination purposes and the non-white LEDs for curing purposes.

In an alternative embodiment of the invention claimed, the switch, referred to now as 2120) may be incorporated into the sensing unit. In this case, power (represented by the thick arrow headed line) is provided through the electronic circuit 2310 and an indication of the detection of a reflected signal, by the detector, is provided to the switch 2120. In this case, power to the LED may be provided through switch 2120 or removed from LED (or varied) with each occurrence of a detection of a reflected signal, as previously discussed.

Figure 22A:
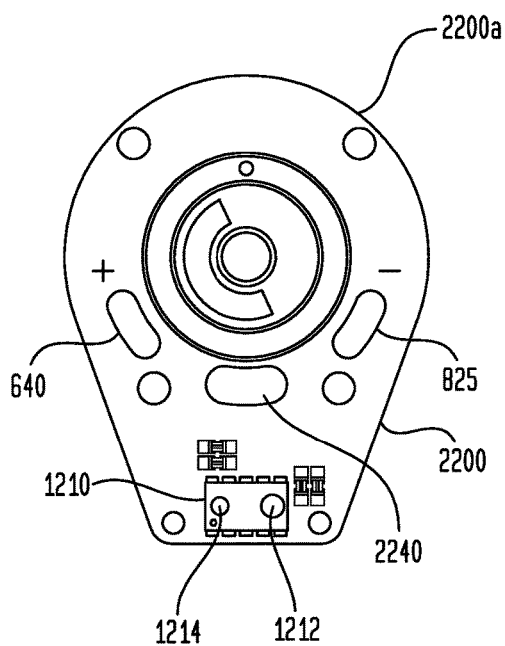
FIG. 22A and FIG. 22B illustrate an exemplary top view and bottom view of a printed circuit board in accordance with the principles of the invention.
Figure 22B:
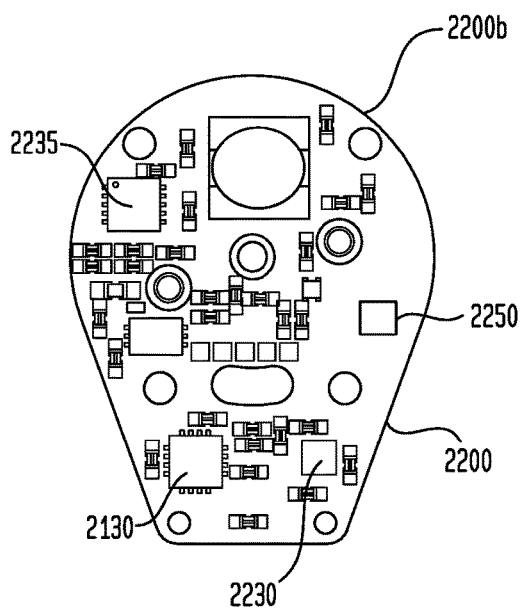

FIGS. 22A and 22B illustrate an exemplary doubled-sided configuration printed circuit board 610 in accordance with the principles of the invention.

FIG. 22A illustrates a top view 2200a of an exemplary printed circuit board 610 containing the electronic circuit 2130, wherein numerous well-known electronic components (e.g., resistors, capacitors and transistors) are shown. Also shown are positive and negative electrical contacts positioned on the top side 2200a of the printed circuit board 610. The positive and negative electrical contacts are similar to positive contact 640 (FIG. 6) and negative contact 825 (FIG. 8). Also, shown is sensing device 1210, which includes transmitter 1212 and receiver 1214 as previously discussed. In this illustrated configuration the sensing device 1210 is positioned in accordance with the configuration shown in FIGS. 12-14. As would be recognized the printed circuit board 610 associated with the embodiments shown in FIGS. 15-20 would be shaped to match the configuration of the lower assembly 130 shown in FIGS. 15-20.

FIG. 22B illustrates a bottom view 2200b of the exemplary printed circuit board 610, wherein numerous well-known resistors, capacitors and/or transistors are shown. Also shown are electronic circuit 2130 and position detecting device (PDD) 2230. PDD 2230 is suitable for measuring the relative X, Y and Z positions, and the orientation, of the printed circuit board (PCB) The PDD 2230 provides a signal to one of the receiving unit (i.e., detector) and the electronic circuit 2130 to effect the presentation of the battery voltage to the at least one lighting element.

In one aspect of the invention, the PDD 2230 differentiates between a nominal desired orientation of the PDD 2230 (and consequently the PCB 610) and an undesired orientation of PDD 2230. Such determination is desirable to prevent inadvertent operation of the headlamp assembly 150, as will be discussed.

A nominal and customary orientation of the eyeglass shown and described herein, is one where the eyeglass is in an essentially horizontal position. That is, nominal position of the eyeglass is on a user's face, wherein the temples are extended over the ear. In this position or orientation, the at least one light source 1230 is aimed in a downward direction. Furthermore, the transmitter 1212 and detector 1214 are positioned in an upward direction (see FIGS. 12-14), for example. Thus, there is little chance of the detector 1214 receiving inadvertent reflections of the transmitted signal. Thus, the at least one light element remains in its intended state.

However, when the eyeglass is outside of its nominal orientation, e.g., hanging downward by a neck-chain or positioned upside down on a plane surface, then PDD 2230 determines the eyewear is in an undesired orientation and inhibits any detection of a transmitted signal from altering a current state of the at least on light element. That is, the output of the PDD 2230 effects the control of a presentation of the battery voltage to the at least one lighting element.

In this aspect of the invention, the control signal of the detector may be a first input to an AND gate while an orientation signal from PDD 2230 may be a second input of the AND gate. In this exemplary configuration, an output of the AND gate is TRUE when both the detector 1214 detects an appropriate reflected signal and PDD 2230 is determined to be in a nominal position. Alternatively, the signal from PDD 2230 and the output of the detector 1214 may be provided to electronic circuit 2130, wherein the electronic circuit 2130 may determine the control of the presentation of the battery output voltage to the at least one lighting element. Electronic circuit 2130 may comprise hardware 2235 such as general purpose processor programmed to respond to the provided inputs, or an embedded processor, such as an ASIC (Application Specific Integrated Circuit) or FPGA (Field Programmable Gate Array) that are programmed to respond to inputs in a desired manner.

As would be recognized, the bounds of nominal orientation of the position detecting unit may be established as an angular value about a nominal axis (e.g., horizontal axis or a known depression angle from the horizontal axis). Thus, when PDD 2230 is within a known angular range from the nominal axis, PDD 2230 provides a positive output. However, outside the known or desired angular range, then the output of PDD 2230 is a negative value. In another aspect of the invention, the determination of the orientation of PDD 2230 may be determined based on the orientation of PDD 2230 over a period of time. For example, a plurality of orientation samples may be taken over time to determine an erratic or a non-uniform movement of the eyeglass wear. In this case, the erratic movement of the eyeglass wear may indicate that the eyeglass wear is hanging and not fixed to the user.

FIG. 23, which is comparable to the side-view of the eyewear shown in FIG. 4 and uses similar reference labelling, illustrates an exemplary configuration of a window of acceptance with regard to operation of the headlamp in accordance with the principles of the invention. In this illustrated case, a window of acceptance is taken with respect to a selected axis (in this case the angle of the depression of the headlamp assembly 150, which is substantially similar to the angle of depression of the illustrated magnification lens 310b). The window of acceptance is further illustrated as being a known number of degrees (represented by B1) below the selected axis and a second known number of degrees (represented by B2) above the selected axis. Although B1 and B2 are shown to be of a different number of degrees it would be recognized that the values of B1 and B2 may be the same or different, as illustrated. Furthermore, while the selected axis is illustrated as being comparable to the angle of depression of the headlamp assembly 150, it would be recognized that the selected angle may also represent the horizontal axis from which the angle of depression of the headlamp assembly 150 is measured. In this case, the values of B1 and B2 are adjusted to compensate for the orientation of the selected axis.

Figure 24:
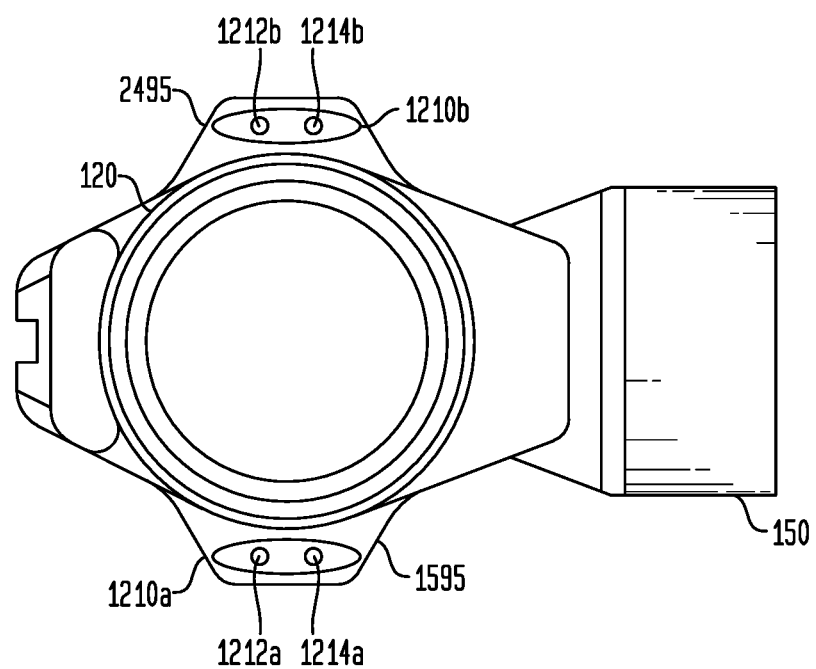
FIG. 24 illustrates a top view of a still further embodiment of a cordless headlight assembly in accordance with the principles of the invention.

FIG. 24 illustrates a top view of a cordless headlight assembly 2400 in accordance with a fifth embodiment of the invention.

In this illustrated embodiment, which is similar to the embodiment shown and discussed with regard to FIGS. 17-20, the cordless headlight assembly, comprises a battery pod 120, a lower assembly 130, a headlamp 150 and a first and second sensing unit 1210a and 1210b, respectively. Sensing units 1210a and 1210b are similar to sensing unit 1210 and are designated with the sub-labels "a" and "b" to distinguish these elements to provide clarity. Sensing units 1210a and 1210b contain corresponding transmitting elements 1212a, 1212b and receiving elements 1214a, 1214b. Transmitting elements 1212a, 1212b operate in a manner similar to transmitting element 1212 and receiving elements 1214a, 1214b operate in a manner similar to receiving element 1214. Thus, the details of the operation of the transmitting and receiving elements would be understood from the prior discussion of these elements and it would be within the skill of the practitioners in the art to understand the operation of the embodiment shown in FIG. 24 with reference to the discussion provide with regard to FIG. 12. for example.

The embodiment shown in FIG. 24 is advantageous as it provides for the determination of a direction of movement of an object passing through the path of the transmitted beams. For example, when a reflection of a transmitted beam associated with transmitter 1212a is detected before a reflection of a transmitted beam associated with transmitter 1212b, then a direction of motion may be deemed to be from right to left. Similar detection of a transmitted signal (or beam) from transmitter 1212b is received before the detection of a transmitted signal (or beam) from transmitter 1212a, a direction of motion may be deemed to be left to right.

Determination of a direction of motion may be advantageous in operating headlight assembly in accordance with the principles of the invention. For example, if motion is determined to be associated with degree of intensity granularity, then right to left motion may be associated with increasing output illumination in stages, wherein left to right motion may be associated with decreasing output illumination in stages. In accordance with another aspect of the invention, if motion is determined to be associated with an output light color then right to left motion may be associated with outputting a white light, using white LEDs, while left to right motion may be associated with outputting a non-white light, using one or more colored LEDs. Similarly, the output color may be varied between white and colored lights based on a number of determined motions. For example, a first motion (assuming right to left) may cause only white LEDs to operate, whereas a second determined motion (same direction) may cause only blue LEDs to operate and a third determined motion (same direction) may cause only red LEDs to operate. In accordance with another aspect of the invention, different numbers of white, blue and red LEDs may be operated with each determined motion (same direction) to produce different combinations of colors. It would be recognized that the color change described with regard to the exemplary right to left motion may be reversed with a determination of an intervening left to right motion.

Figure 25A:
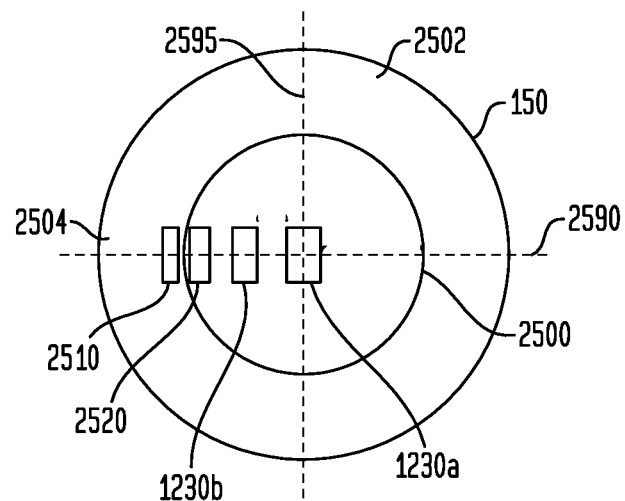
FIGS. 25A and 25B illustrate an exemplary configuration of a light color changing cordless headlight assembly in accordance with the principles of the invention.
Figure 25B:
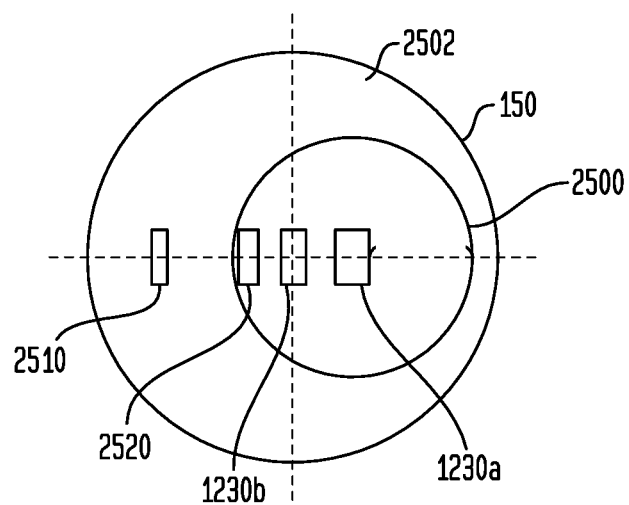

FIGS. 25A and 25B illustrate an exemplary application of the use of motion in altering a color output of the at least one LED contained in headlamp assembly 150.

FIG. 25A illustrates an exemplary application of the use of detected motion to determine a color output of the at least one LED contained in the headlamp assembly 150.

FIG. 25A illustrates a printed circuit board 2500 within headlamp assembly 150 containing a first set of LEDs 1230a and a second set of LEDS 1230b. The first set of LEDs 1230a having a different light color output than the second set of LEDs 1230b. In this exemplary configuration, the first set of LEDs are aligned with the optical axis of the headlamp assembly 150 (as represented by the intersection of the vertical 2595 and horizontal 2590 dotted lines).

Further shown is permanent magnet 2510 positioned along an edge of PCB 2500 and an electro-magnetic 2520 positioned on the PCB 2500.

In this illustrated embodiment, a voltage is applied to electro-magnetic 2520, which causes a polarity of the electro-magnetic 2520 to be attached to permanent magnetic 2510 and LEDs 1230a to be aligned to the optical axis of the headlamp 150. Furthermore, in this configuration, power is applied to the first set of at least one LEDs, and reduced or removed from the second set of at least one LEDs such that only the first set of LEDs are activated to output light. The color of the outputted light is associated with that of the first set of LEDs.

FIG. 25B illustrates the use of motion wherein a determined motion (e.g., right to left) of an object transitioning through the light beams transmitted in the exemplary shown in FIG. 24, causes a second light color of the LEDs to be outputted. In this case, the determination of a motion (e.g., right to left) causes the voltage applied to the electro-magnetic 2520 to be such that the electro-magnetic 2520 is repealed from permanent magnetic 2510. As PCB 2500 is mounted onto or attached to rails, PCB 2500 slides along rails (not shown) such that the second set of LEDs 1230b is aligned with the optical axis of the headlamp assembly 150. In this case, power is applied to the second set of LEDs while power is removed from the first set of LEDs. Thus, only a light have a color associated with the second LEDs is outputted.

As would be appreciated, when a determined motion is left to right, the voltage applied to the electro-magnetic 2520 is such that electro-magnetic 2520 is attracted to permanent magnetic 2510. In this case, the PCB 2500 slides along the rails (not shown) to return to the position shown in FIG. 25A such that the first set of LEDs is positioned at the optical axis of the headlamp 150. As previously discussed, power is concurrently applied to the first set of LEDs and removed from the second set of LEDs.

Figure 26:
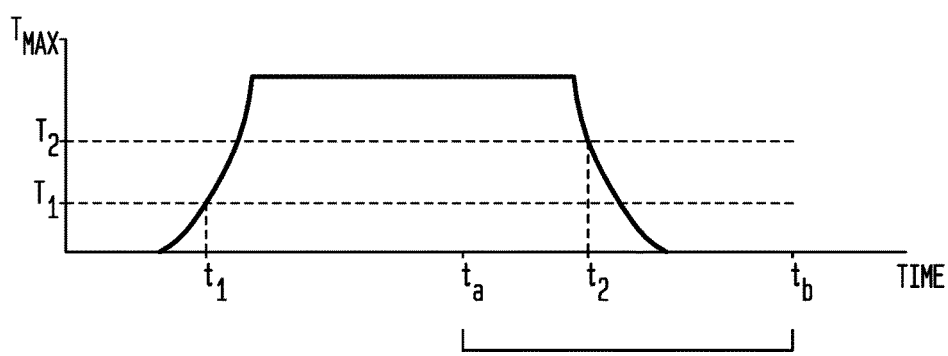
FIG. 26 illustrates an exemplary timing diagram for determining the presence of a detected signal in accordance with the principles of the invention.
Figure 27:
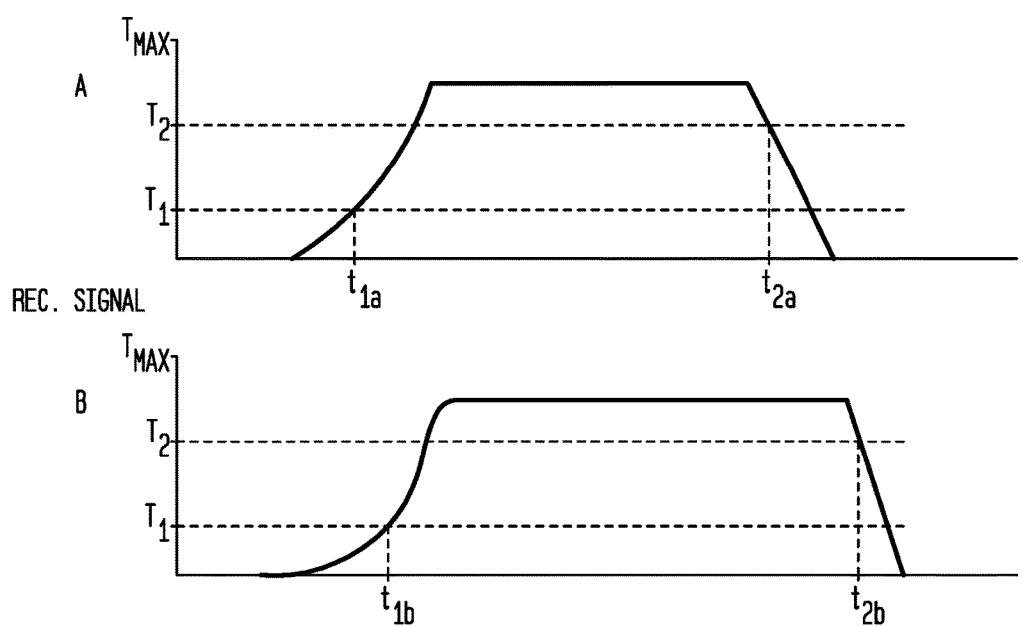
FIG. 27 illustrates an exemplary timing diagram for determining a direction of motion in accordance with the principles of the invention.
Figure 28:
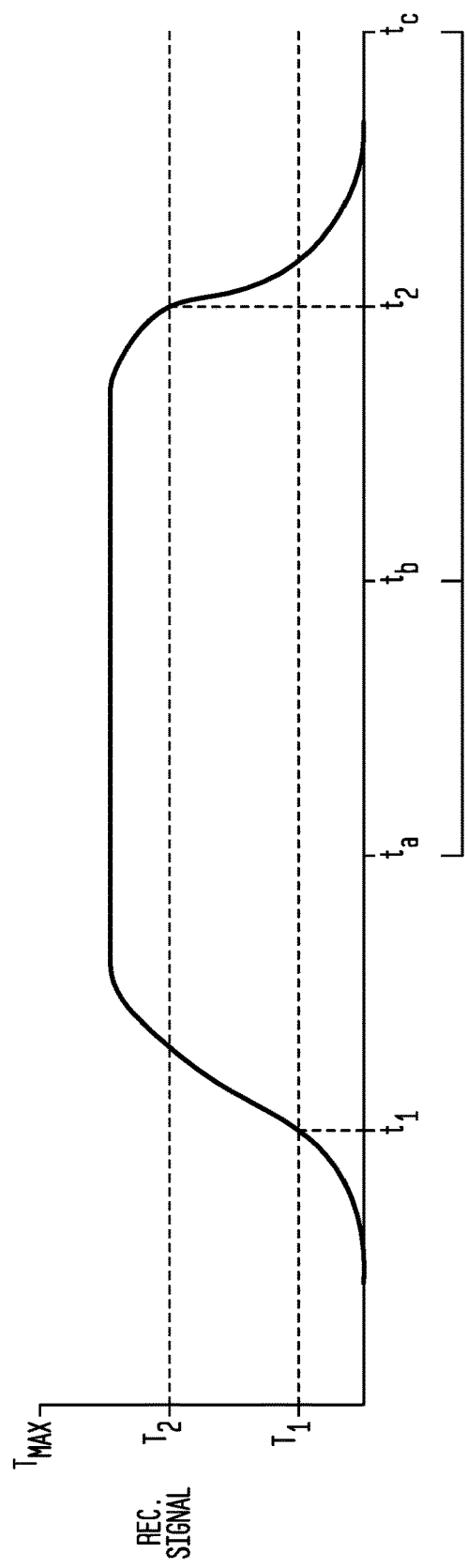
FIG. 28 illustrates an exemplary timing diagram for determining different operational functions in accordance with the principles of the invention.

FIGS. 26-28 illustrate exemplary timing diagrams in accordance with the principles of the invention.

FIG. 26 illustrates an example of determining a time of detection of a reflected signal in accordance with the principles of the invention. In this illustrated example, the vertical axis represents a magnitude of a signal detected by receiver 1214, for example. T1 represents a first threshold, which as previously discussed represents a magnitude above which a detected signal is considered valid. Tmax represents a second threshold, which as previously discussed represents a magnitude above which a detected signal is considered invalid (i.e., too close). T2 represents a magnitude below which the magnitude of the received signal is considered ended. Although T1 and T2 are shown as different values, it would be recognized that T1 and T2 may be the same value or T2 may be greater or less than T1.

The horizontal axis represents a time, wherein t1 represents a time that the magnitude of a received signal exceeds the threshold T1 and t2 represents a time that the magnitude of the received signal falls below the threshold T2.

Further shown are time values ta and tb, which represent time values associated with an expected distance of an object traversing a path of a transmitted signal.

In accordance with the principles of the invention, when the magnitude of a received signal crosses threshold T1, at time t1, a first indication is generated. When the magnitude of the received signal falls below threshold T2, at time t2, a second indication is generated. A difference between the second indication and the first indication may be determined and the determined difference is compared to the range of times represented by ta and tb. If the difference in time of the magnitude of the received signal is within the range represented by ta to tb, the received signal is considered valid (both in magnitude) and in time. An indication of the valid signal is then provided to the electronic circuit 2130 to alter the state of the at least one light source 1230 in the headlamp assembly 150.

Thus, in accordance with the illustrated magnitude/timing diagram shown, received signals that are too low (below T1) or too high (greater than Tmax) are deemed invalid even if the time length of time is within the range ta to tb. Similarly signals that are within the range of thresholds T1 and Tmax whose durations are too short (i.e., less than ta) or too long (i.e., greater than tb) are determined to be invalid. As previously discussed reflected signals that are deemed invalid fail to cause any change in the state of the at least one LED in headlamp assembly 150.

FIG. 27 illustrates an exemplary timing diagram in accordance with the embodiment of the invention shown in FIG. 24, wherein a determination of motion may be made based on a relative timing between the detection of signals from each receiver or detector (1214a, 1214b) of the first sensing unit 1210a and the second sensing unit 1210b) (see FIG. 24). FIGS. 27a and 27b illustrate timing diagrams similar to that shown in and described with regard to FIG. 26, wherein each of the first sensing unit and the second sensing unit independently detect a reflection of a corresponding transmitted signal. In this illustrated example, a reflected signal (above threshold T1) is first detected by receiver 1214a, for example, at time t1a and has a duration extending to time t2a. Similarly, a reflected signal (above threshold T1) is detected by receiver 1214b, for example, at time t1b and has a duration represented by the difference between t2b and t2a.

In this case, as t1a is earlier than t1b, a motion of an object traversing the transmitted beams of transmitters 1212a, 1212b, respectively, may be determined to be from right to left. Similarly, if t1b is earlier than t1a, then motion may be determined to be from left to right. As would be recognized, the determination of motion may provide for different functionality, such as increase intensity in steps. For example, an increase in illumination intensity (i.e., increase of battery voltage/current to the at least one lighting source) may be performed in a number of steps so as to increase the intensity from zero intensity to a maximum intensity, wherein the number of steps may be prefixed and/or programmable. In one example, the level of intensity granularity may be limited to one (i.e., turn ON from a turned OFF state). In another example, the level of granularity may be two, wherein a first detection of a reflected signal in a first direction may increase the illumination intensity such that the light output is at one-half (½) maximum, while a second pass in a same direction may increase the voltage to the lighting unit to a maximum value. In this case, the illumination output is at a maximum. While only one and two levels of intensity granularity are discussed, it would be recognized that the number of steps may be increased further without altering the scope of the invention.

In another aspect, the degree of illumination intensity may be decreased in a manner similar to increasing the intensity based on the determined direction of motion.

In another aspect of the invention, a color of the light output may be affected by the determined direction of motion. For example, a first determined direction of motion may provide power to only a first set of LEDs, wherein a second determined direction of motion, different than the first determined direction of motion, may provide power to only a second set of LEDs. In another aspect of the invention, repeated determination of a same direction of motion may vary the power between a first set and a second set of LEDs such that different colors of light output may be generated. Furthermore, as discussed with regard to FIGS. 25A and 25B, the direction of motion may be used to position either the first set of LEDs or the second set of LEDs to the optical axis of the housing 150. For example, a first direction of motion may cause electrical energy to be applied to the electro-magnet such that a first set of LEDs is positioned at the optical axis of housing 150. Alternative, a second direction of motion, opposite that of the first direction of motion, may cause electrical energy to be removed from the electro-magnet such that a second set of LEDs is positioned at the optical axis of housing 150.

FIG. 28 illustrates an exemplary timing diagram in accordance with the principles of the invention. In this illustrated embodiment, a plurality of timing ranges (two being shown) are identified. The first timing range (from ta to tb) is similar to that shown in FIG. 26, wherein a valid signal is one that has a magnitude between T1 and Tmax and a duration between ta and tb. Also, shown is second timing range (from tb to tc) wherein a detected reflected signal having a duration from t1 to t2, which is within the second timing range, may cause a different operation of the light source within the headlamp 150. For example, a reflected signal having a duration between ta and tb, may alter the state of the at least one lighting source of element (e.g., ON/OFF or OFF/ON). Whereas a reflected signal having a duration that falls within the second timing range (tb to tc) may alter the voltage applied from one set of LEDs to a second set of LEDs, as discussed with regard to FIGS. 25A and 25B. Hence, a reflected signal having a duration within the second timing range may cause the color output of the headlamp assembly 150 to change from one color to a second color.

Returning to FIG. 22A, an ambient light sensor 2240 may be incorporated onto the upper surface 2200a of PCB 610. Ambient light sensor 2240 is configured to measure a level of a surrounding light and, in one aspect of the invention, set the threshold values based on the determined ambient light level. In this exemplary embodiment, the threshold values may be adjusted, for example, from preset threshold levels when a high ambient light level is determined. In another aspect of the invention, the ambient light sensor 2240, may determine whether a frequency (or wavelength) of light corresponding to the transmitted light of the transmitter 1212 exists in a surrounding light and/or measure a level of the frequency/wavelength of light corresponding to the transmitted light of the transmitter 1212 in the ambient light. The ambient sensor 2240 may then, based on at least one of the determined existence, or the level, of a frequency/wavelength of light corresponding to the transmitted light of the transmitter 1212, raise or adjust the threshold values from their preset values. Hence, in a high ambient light condition, wherein a wavelength of the transmitted light of transmitter 1212 is found in the surrounding ambient light, then the threshold values may be increased such that the surrounding ambient light is not considered as part of any reflected light.

Figure 29:
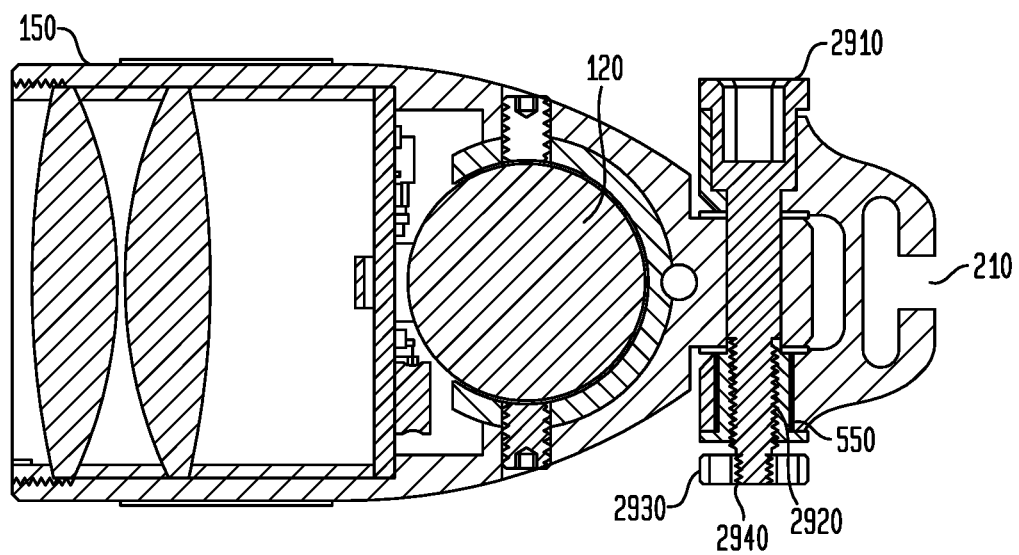
FIG. 29 illustrates a cutaway top view of a cordless headlight assembly in accordance with the principles of the invention.

FIG. 29 illustrates a top cutaway view of the locking mechanism of the headlamp assembly showing the retaining screw/nut which was discussed with regard to FIG. 12.

In this illustrated aspect of the invention, a screw 2910 is inserted into pass through (i.e., passageway) 550 which is used to attach headlamp assembly 150 to the lower assembly (not shown). In this exemplary aspect of the invention, screw 2910 enters passage-way 550, at a first end of the connection passage-way 550 and engages a nut 2930 positioned at a second, and opposite, end of connection passage-way 550. Further shown are threads 2920 contained within passage-way 550. Threads 2920 engage corresponding threads on screw 2910. In one aspect of the invention, clockwise rotation of screw 2910 causes end portions of the headlamp assembly 150 to tighten about connector (extension) 145 of the lower assembly (not shown) that is contained between the end portions of the headlamp assembly 150. As the end portions of the headlamp assembly 150 tighten about the extension 145 of lower assembly, headlamp assembly 150 retained in a desired position.

As would be recognized, when the screw 2910 is rotated counterclockwise, there is a possibility to remove the screw 2910 from passage-way 550, resulting in the possibility of the screw 2910 becoming a loose element, which may be lost or dropped at an inappropriate time. In order to avoid the possibility of removing the screw 2910 completely, nut 2930 captures an end of screw 2910 extending from passageway 550. Furthermore, nut 2930 includes a left hand thread 2940, which matches a similar thread configuration on the end of screw 2910. In this exemplary embodiment of the invention, screw 2910 cannot be detached from nut 2930 as screw 2910 is continually turned counterclockwise. Rather, additional counterclockwise rotation of screw 2910 causes a tightening of the end portions of the headlamp assembly 150 about the extension 145.

As described herein, a screw/nut configuration is disclosed to retain headlamp assembly 150 to lower assembly 130, it would be recognized, the means for retaining a fixed configuration between assembly 150 and assembly 130, may further comprise a plurality of passageways 550a-550x (not shown) through which pin 140 may be inserted. Passageways 550a-550x represent individual passageways or passthroughs that offset from one another so that the plurality of passageways represent a plurality of fixed orientations of assembly 150 and assembly 130.

Furthermore, although the screw/nut configuration has been described with regard to a conventional right-hand/left-hand thread configuration, it would be recognized the screw/nut configuration may also employ a left-hand/right-hand thread configuration without altering the scope of the invention.

Figure 30:
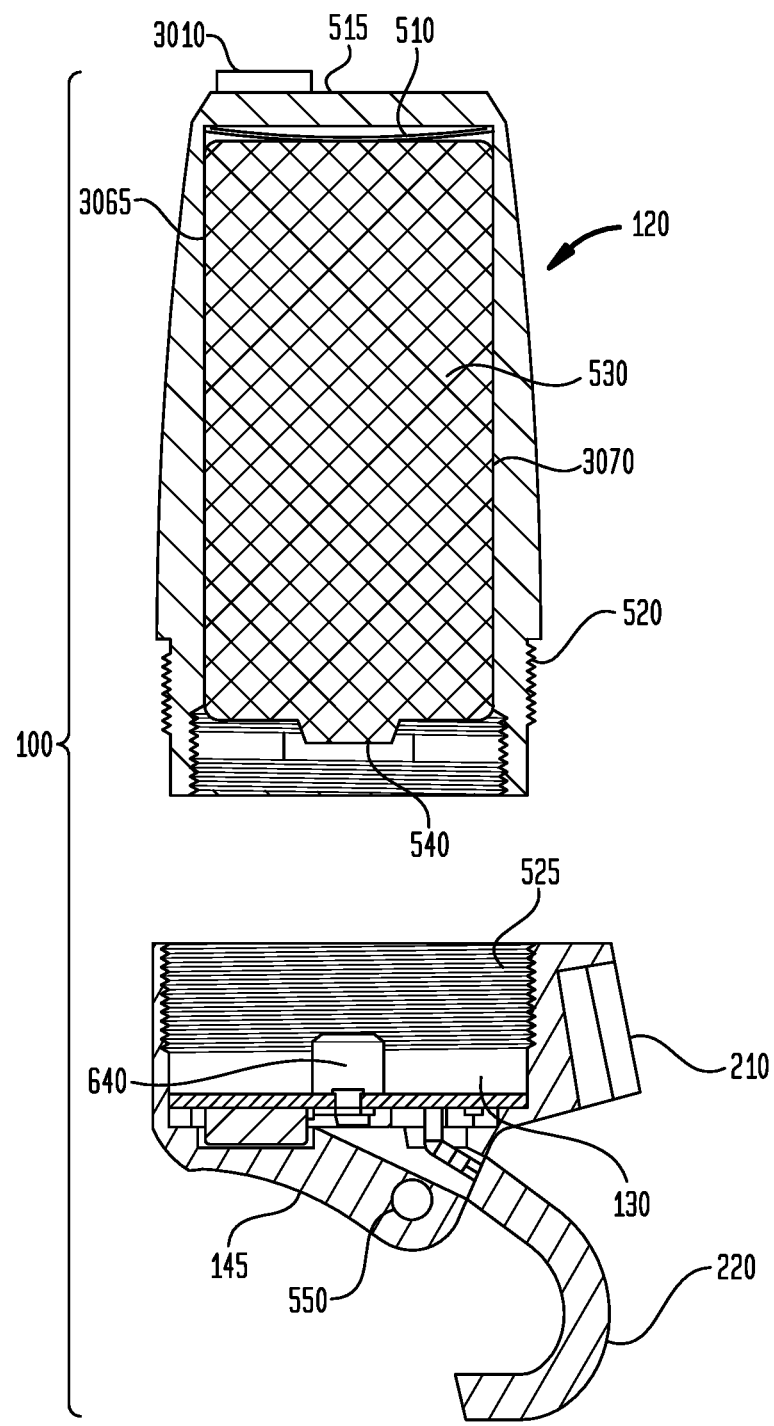
FIG. 30 illustrates a cross-section view of a cordless headlight assembly in accordance with still another embodiment of the invention.

FIG. 30 illustrates still another embodiment of a cordless wireless headlight assembly in accordance with the principles of the invention.

FIG. 30 illustrates a cross-sectional view of a cordless wireless headlight assembly, similar to the cross-sectional view shown in FIG. 5. As described with regard to FIG. 5, battery 530 is contained within battery pod 120. Battery pod 120 includes, at its second end, a dome cover 515, which in this illustrated embodiment includes a sensing unit 3010, which is similar to sensing unit 1210 described with regard to FIGS. 10 and 12. Sensing unit 3010 includes at least one transmitter and at least one receiver (not shown), similar to transmitters 1212 and receivers 1214, also described with regard to FIG. 12. The transmitter and receiver contained within sensing unit 3010 operate in a manner described with regard to FIGS. 12-14, for example, and it would be within the skill of the practitioners in the art to understand the operation of the embodiment shown in FIG. 30 with reference to the discussion provide with regard to FIG. 12.

Also illustrated are treads 520 circumscribing an end of battery pod 120. Treads 520 provide a means for battery pod 120 to engage housing or connector element or assembly 130.

Also shown is housing or connector element 130 and connector 145. Within, and transverse to, connector 145 is pass-through 550. Pass through 550 allows pin 140 to connect housing element 130 to headlamp assembly 150, as previously discussed. Rotation of headlamp assembly 150 about pin 140 provides for a change in orientation of headlamp assembly 150 with respect to housing element 130 and battery pod 110.

Also shown, within housing element 130 are screw threads 525. Screw treads 525 engage threads 520 to connect battery pod 120 to housing element 130.

Further shown are electrical connections 3065, 3070, which extend from the electronic circuit (not shown) in the lower assembly 130 to the sensing unit 3010. Electrical connection 3065, for example, provides power to sensor unit 3010 to power the contained transmitter and receiver. Connector 3070 represents an electrical conduit (or connection) through which an indication of a detection of a reflection of a signal transmitted by the transmitter.

The embodiment of the cordless headlight shown in FIG. 30 operates in a manner similar to that shown in FIGS. 12-20, wherein the transmitter transmits a signal or beam of energy (RF, IR, audio) and the receiver detects a reflection of the transmitted signal or beam. An indication of the detection of the reflection of the transmitted signal is provide to the electronic circuitry (not shown, but similar to that shown in FIGS. 22A, 22B), which may determine at least one of a magnitude and a duration of the detected signal (see FIG. 26). Further the electronic circuitry (not shown) may determine a function to be performed by the at least one lighting element within the housing 150, based on a duration of the detected signal (see FIG. 26, 28). Although not shown, it would be appreciated that at least two sensing units 3010 may be incorporated onto, or within, the top portion of battery pod 120, such that motion may be determined, as described with regard to FIG. 27.

In summary a self-contained headlight assembly comprising a battery and lamp has been disclosed wherein the headlight assembly, which may be removably attached to one of a headwear, a headset, an eyeglass frame, provides for the touchless alteration of a voltage applied to at least one light source 1230 to turn the light source 1230 ON/OFF and/or change the color of the output light and/or adjust the level of intensity (i.e., granulation) of the at least one outputted light. Further disclosed is a means for determining a direction of motion of an object traversing at least one light beam emanating from at least one sensor generating and receiving a signal wherein the determined direction of motion may be used to provide further functionality. Further disclosed is a means for positioning the sensor units to avoid spuriously or inadvertent detections of the reflected signals.

To provide further reliability of the operation of the headlight assembly disclosed and to avoid the detection of inadvertent reflections (false triggering) of a transmitted signal (e.g., an IR signal), as discussed with regard to FIGS. 22A and 22B and PDD 2330, a further processing may be incorporated into the headlight assembly 100 to insure operation of the light source 1230 is when desired and not by a false trigger. As previously discussed, inadvertent operation of the light source 1230 may occur by a change of position of the headlight assembly, such that it is near an object from which detections may be received (e.g., hanging downward).

However, while the operation of PDD 2230 is disclosed with regard to positioning of the headlight assembly 100 being outside a nominal range, false triggering of the operation of the light source 1230 may also occur when the headlight assembly 100 is within a nominal range and the user moves the headlight assembly 100 (e.g., by turning their head) and the outputted signal is reflected back by a neighboring object. The detected reflected signal may be sufficient to cause the operation of the light source 1230 to change or alter its state (e.g., turn OFF). Thus, the light outputted by the light source 1230 may be turned ON or turned OFF when the user does not desire such a turn-on or a turn-off to occur. Thus, the inadvertent operation of the light source 1230 by false triggering becomes a nuance to the user as the user must perform an action to return the light source 1230 to a desired condition.

To avoid false triggering and the inadvertent operation of the light source 1230 caused by reflection from an unwanted reflecting object, motion sensing circuitry 2250 is incorporated onto PCB 610 (FIGS. 6, 22A, 22B) to provide signals to electronic circuitry 2130 on PCB 610 (FIG. 22B) to further control the activation/deactivation of the light source 1230 within the headlamp assembly 150 of headlight assembly 100. Specifically, the motion sensing circuitry 2250 employees one or more sensing elements (e.g., accelerometers) for determining and monitoring movement of the headlight assembly 100 to determine whether the headlight assembly 100 is in motion or in a non-motion (stable) condition. When a stable state condition (i.e., substantially non-movement) is determined, the motion sensing circuitry 2250 provides a motion stable signal to the electronic circuitry 2130 on PCB 610 in order to control switch 2110 (or switch 2120, FIG. 21) to allow the transition of the light output of headlight assembly 100 from one state to another state.

While the transition of the light source 1230 within the headlamp assembly 150 from one state to another state is discussed with regard to applying a voltage/current (to turn ON a light source 1230) or remove a voltage/current (to turn OFF a light source 1230), it would be recognized that this discussion regarding a binary transition is merely to describe the invention claimed. It would be appreciated that the granularity of the application (or removal) of the voltage/current from the light source 1230 may be in a plurality of steps, wherein transition of the application of a voltage to light source 1230 may progressive increase, for example, for each determination of a valid detection of a reflected signal. The application of the voltage/current may, after a maximum voltage has been applied, may be progressively reduced for each determination of a valid detection of a reflected signal. Thus, progression of an application of a voltage/current to the light source may continue from a minimum applied voltage to a maximum applied voltage to a minimum (e.g. zero volts) in a plurality steps (two or more).

In accordance with the principles of the invention, electronic circuitry 2130 on PCB 610 receiving both a motion stable signal from the motion sensing circuitry 2250 and the reflection of the transmitted signal, provides an indication that the detection of the reflection is valid and allows a change of state of the light. That is, circuitry 2130 on PCB 610 requires a validation of the received reflection by a determination of a non-motion or stable status of the light source 1230 within the headlamp assembly 150 of headlight assembly 100.

In accordance with the principles of the invention, motion of the headlight assembly 100 may be determined using an inertial measurement unit (IMU) integrated into electronic circuitry 2130 on PCB 610 or may be a separated unit 2250. In one aspect of the invention the IMU 2250 may be one of a 3-axis accelerometer, a 3-axis gyroscope, or a 6-axis combination of the two. Motion detection may also be performed using a 1-axis IMU, utilizing PDD 2230 wherein positional measurements may be taken over time to determine whether there is a substantial positional change in one or more of the X, Y, and Z axis. Similarly, motion detection may be performed with 9 axes of motion or more (by adding a GPS system, magnetometer, etc.).

In accordance with a first embodiment of the invention, a 3-axis accelerometer may be incorporated, as IMU 2250, into the headlight assembly 100 to measure movement or stability of the headlight assembly 100. A 3-axis accelerometer determines changes in position along corresponding ones of an X axis, a Y axis and a Z axis (which represents a conventional Cartesian coordinate system), wherein the Z axis, arranged to point towards the center of the Earth experiences an acceleration vector with a magnitude of approximately 1 g (1 gravity) acting on the device. Accordingly, the IMU (i.e., accelerometer) 2250 and headlight assembly 100, the magnitude of the acceleration vector along the Z-axis is substantially 1 g when the device is not moving To provide a reference regarding movement, in an exemplary embodiment of the invention, the IMU (i.e., 3-axis accelerometer) 2250 is mounted such that the Z-axis of the accelerometer is directly up when the headlamp assembly 150 (FIG. 1) is pointed straight forward, the X-axis is axial to, and in the direction of, the light outputted by the headlamp assembly 150, and the Y-axis is pointed to the user's left. In this exemplary embodiment, when the headlight assembly 1—is pointing straight forward, the system will read 0 g in the x and y directions, and +1 g in the z direction.

In accordance with the principles of the invention, a determination of no motion may be made when a difference between two successive readings of IMU 2250 (i.e., accelerometer), taken at a known rate, is substantially zero. That is, the readings of the accelerometer outputs are substantially identical at two different measured times. This may be expressed, in the C programming language, as:

if ((x[0]==x[-1]) && (y[0]==y[-1]) && (z[0]==z[-1]))
   moving=false;

That is, if the reading at current time (e.g., x[0]) is the same (symbol==) as, or substantially equal to, a reading at another time (e.g., x[-1]) then no motion is deemed to have been detected and similar determinations (symbol &&) are made along a "y" axis and a "z" axis, then IMU (i.e., accelerometer)r 2250 is determined to be stable—i.e., no motion.

In accordance with the principles of the invention, the determination of stability or no motion may be extended to the readings of a corresponding axis being substantially the same for several samples (i.e., x[0], x[-1], x[-2], x[-3] . . . ) before deciding that the device is stationary or not in a state of motion. In addition, the several samples may be summed together to form an average sample value, which may then be compared to a current sample value. If the average sample value is within a tolerance (e.g., 1%) of the current sample value, then a determination of non-motion may be indicated.

Figure 31:
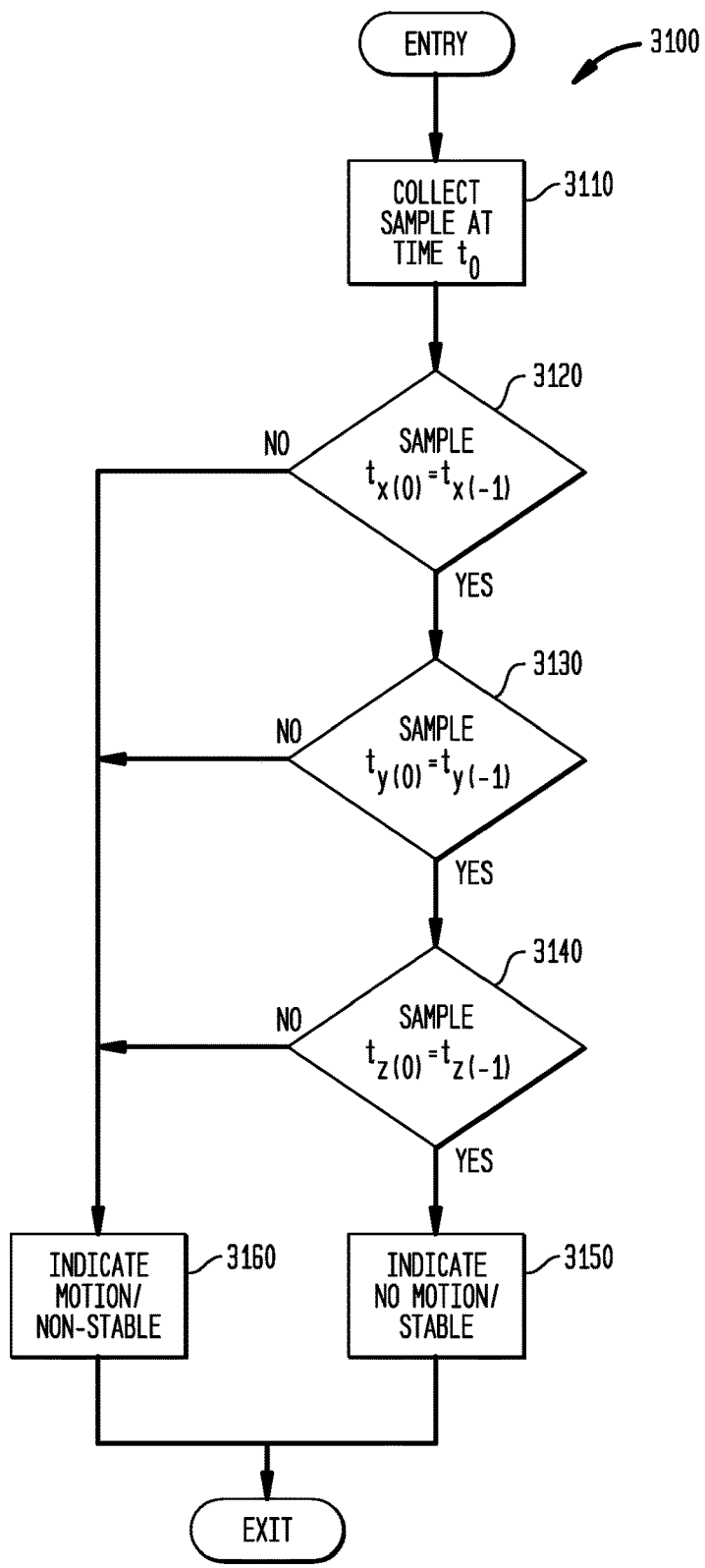
FIG. 31 illustrates a flowchart of an exemplary process in accordance with the principles of the invention.

FIG. 31 illustrates a flowchart of an exemplary processing 3100 in accordance for determining motion in accordance with the principles of the invention. In the illustrated embodiment, samples are collected from accelerometer 2250 for each of the axises at step 3110. At step 3120, the collected sample on a first axis is compared to a prior sample. If the values are substantially equal or substantially the same, then processing continues to step 3130 wherein the collected sample on a second axis is comparable to a prior sample of a second axis. If the values are substantially equal or substantially the same, then processing continues to step 3140. At step 3140, the collected sample on a third axis is compared to a prior sample on the third axis. If the values are substantially equal or substantially the same, then processing continues to step 3150 wherein an indication of stable (non-motion) is outputted.

However in any of the first, the second and the third samples of a current time fail to substantially match a prior sample, then processing continues to step 3160, wherein an indication of "not stable," or "motion" is outputted.

In accordance with another aspect of the invention, it may be determined that a user or the headlight 100 is moving when a combination of the readings of the three axes causes the combined magnitude to be different than 1 g, assuming the magnitude of the acceleration vector should be substantially 1 g when the system is stationary. That is, the motion in the x-direction and the y-direction is substantially zero, while the motion in the z-direction is measured as +1.

In accordance with the principles of the invention a magnitude of the readings of the three axis may be joined together to determine a magnitude and angle (i.e., a vector measure). The vector measure may be compared to a known range to determine whether a motion has occurred, or the headlight assembly 100 is stationary (stable, non-movement).

Figure 32:
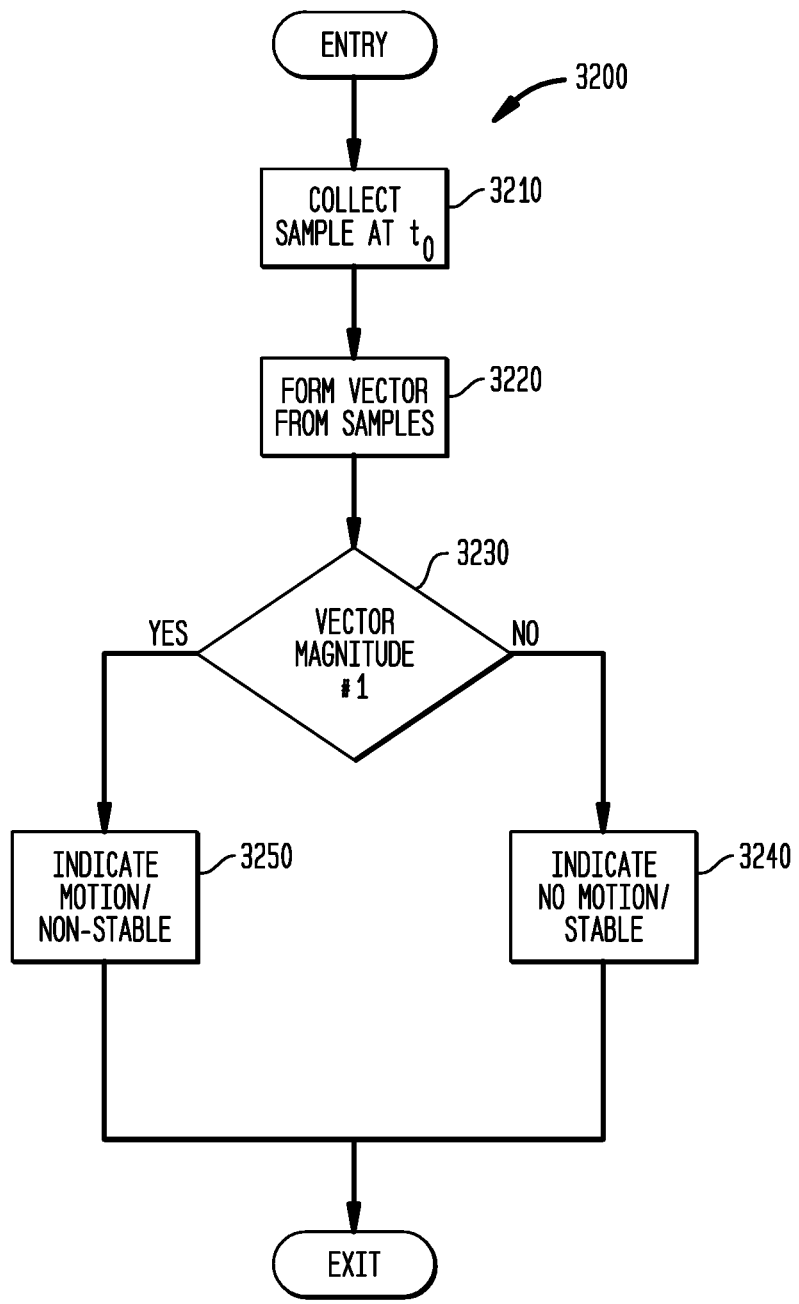
FIG. 32 illustrates a flowchart of a second exemplary process in accordance with the principles of the invention.

[This may be expressed as:

$$\text{magnitude}^2 = x^2 + y^2 + z^2;$$

if(low threshold<magnitude$^2$<high threshold)
    moving=false;

FIG. 32 illustrates a flowchart of an exemplary processing 3200 in accordance with the principles of the invention for determining motion in accordance with the principles of the invention. In the illustrated embodiment, samples are collected from accelerometer 2250 for each of the axises at step 3210. At block 3220 a vector is formed based on the collected samples. At block 3230 a determination is made whether the magnitude of the resultant vector is substantially different than 1 (i.e., 1 g). If the vector magnitude is not substantially different than 1, (i.e., the vector magnitude is within a tolerance about the nominal 1 g reference), the processing continues to step 3240, wherein the accelerometer 2250 is marked as stable. Otherwise, processing continues at block 3250 indicating the accelerometer 2250 is in movement or not stable.

In another embodiment of the invention, a 3-axis gyroscope (not shown) may be utilized as OMU 2250 and incorporated onto the PCB 610. In this exemplary embodiment, the user is deemed stationary when the reading on all gyroscope channels are, or substantially near, zero (0).

In accordance with one aspect of the embodiment, a gyroscope (not shown) may be mounted such that the X axis represents pitch of the headlight (forward and backward motion), the Y axis represents roll of the headlight (tilting left and right), and the Z axis represents the yaw of the headlight (rotating left and right).

In accordance with the principles of the invention, the absolute output values of the X, Y, and Z axises may be used to determine a magnitude, which may be compared to a threshold value. When the magnitude is less than the threshold value, the headlight assembly 100 is deemed to be stable (i.e., no motion). In accordance with another aspect of the invention, a plurality of measured magnitude values may be passed through a low pass filter before comparing the magnitude to the threshold value.

In accordance another aspect of the invention, a plurality measurements from each of the X, Y, and Z axises may be separately processed through a corresponding low pass filter, wherein each low pass filter may have the same or different threshold values. The resultant measurements may then be combined to determine a magnitude value from which a determination of stability or motion may be made.

In accordance with this aspect of the invention, a large movement in a single axis of the motion detector 2250, or smaller movements in multiple axes, may result in an indication of motion.

In accordance with another aspect of the invention, instead of the sum of the gyroscope readings being made, a magnitude of the rotation of the 3-axis gyroscope may be used to determine stability/motion.

In accordance with another aspect of the invention, a more accurate determination of stability/motion by be obtained by combining data from an accelerometer and a gyroscope. In this case, the data from the accelerometer and the gyroscope may be processed separately and confirmation of no-motion being made when the results of both measurements indicate no-motion. Alternatively, the resultant data from the accelerometer and the gyroscope may be combined to determine stability/motion.

In this case, as information received from the accelerometer or the gyroscope (not shown) may be redundant, a more advanced filter may combine the information from the two sources to produce a more accurate determination of stability/motion.

In one aspect of the invention, the data from multiple sources may be applied to a Kalman filter, wherein a model may be developed for the variables involved and the Kalman filter proportionally applies readings from the various sources based on estimates as to the source accuracy. Using a Kalman filter, an estimation of device speed and rotational magnitude may be produced for determining motion.

In accordance with the principles of the invention, Information regarding motion of the headlight assembly 100 may be obtained from a plurality of other sources. For example, GPS receivers, are capable of providing position and velocity information, and magnetometers, provide information regarding orientation relative to Earth's magnetic field.

Figure 33:
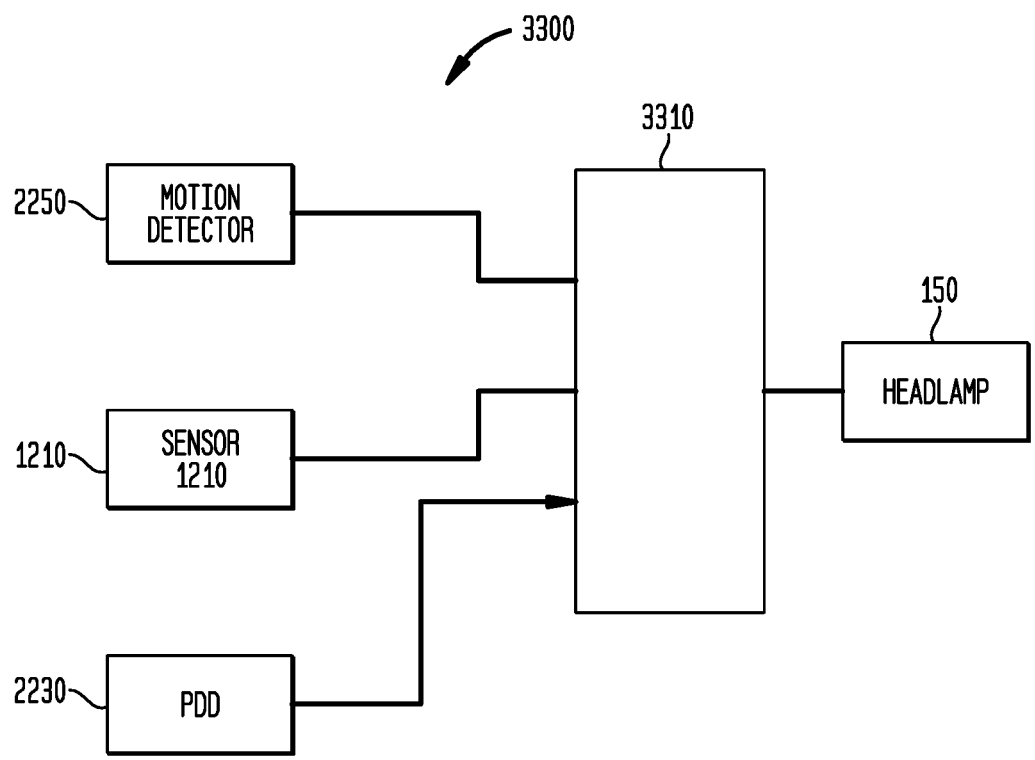
FIG. 33 illustrates an exemplary block diagram of a circuit configuration in accordance with the principles of the invention.

FIG. 33 illustrates a block diagram 3300 of an exemplary configuration for controlling the output of a light source 1230 incorporated into headlamp assembly 150. As illustrated, the output of motion detector 2250 may be applied to a processing circuit 3310 (which as previously discussed may be dedicated or programmable hardware or a special purpose processor). The output, as discussed, may be one of "stable," and "not stable" (i.e., movement, motion). Further illustrated is sensor 1210, which provides an output upon the detection of a transmitted signal, as previously discussed (see FIG. 21). The output of sensor 1210, is provided to processor 3310, wherein processor 3310 validates a transition of the state of the light source 1230 in headlamp assembly 150, when the headlight assembly is indicated as being stable and a reflection is detected. Otherwise, the state of the light source 1230 in headlamp assembly 150 remains unchanged. Thus, a voltage applied to the light source 1230 in headlamp assembly 150 is changed only when the condition of stability and reflection are satisfied.

Further illustrated is PDD 2230 (See FIG. 22B) providing an input to processor 3310. PDD 2230, as previously discussed, determines an orientation of headlight assembly 100. In this illustrated example, the output of PDD 2230 may further provide information regarding transitioning the light source 1230 in headlamp assembly 150 from one state to another. For example, voltage may be applied to the light source 1230, when a stable (non-moving) headlamp 100 (as determined by motion detector 2250) is in an correct orientation (as determined by PDD 2230) and a reflection is detected (as determined by sensor 1210). In accordance with an embodiment of the invention, the voltage may be removed from the light source 1230 when a reflection is detected by a headlight assembly that is in the correct orientation and in a stable condition.

Alternatively, the signal provided by PDD 2230 may be a singular event, which causes the voltage to be removed from the light source 1230 when PDD 2230 indicates headlight assembly is operating outside of the nominal limits.

Figure 34:
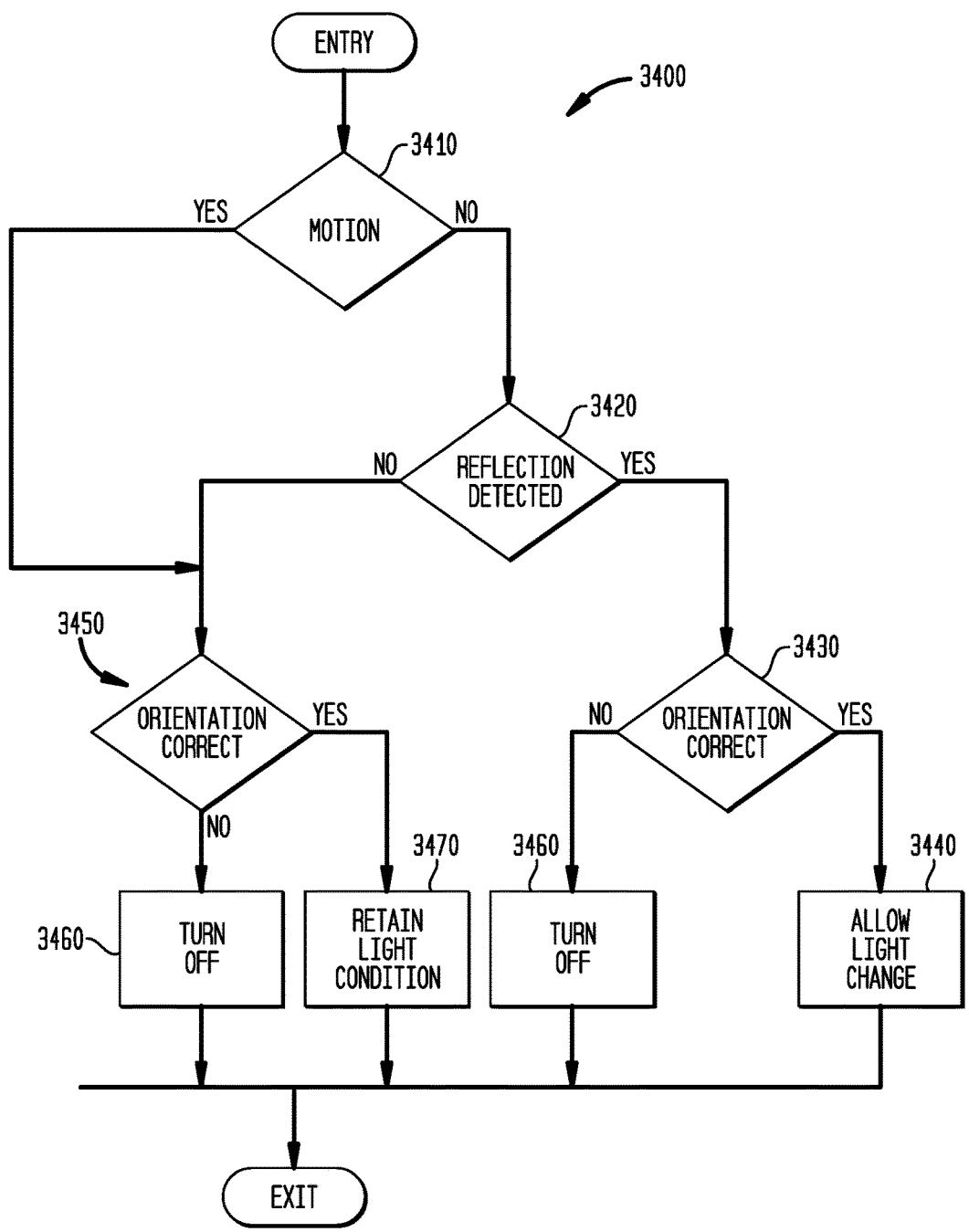
FIG. 34 illustrates a flowchart of an exemplary process for controlling the application of a light source in accordance with the principles of the invention.

FIG. 34 illustrates a flowchart of an exemplary process 3400 for controlling the application of a light source 1230 in accordance with the principles of the invention.

At step 3410, a determination is made whether motion (or non-motion) of the headlight assembly 100 exists. If no motion is determined, processing continues to step 3420, wherein a determination of the detection of a reflected signal is made. If a reflected signal is detected, then processing continues to step 3430, wherein a determination is made that the headlight assembly is within a nominal (or desired) orientation. If the orientation is within the nominal or desired orientation, processing continues to step 3440, wherein the output of the light source 1230 is altered. That is, at step 3440, the voltage applied to the light source 1230 may be changed, such that the light source 1230 may be turned ON (i.e., voltage applied) or turned OFF (i.e., voltage removed). Alternatively, the voltage to the light source 1230 may be incrementally increased or incrementally decreased. However, if the orientation of the headlight assembly 100 is not within the nominal or desired range, then processing proceeds to step 3460, wherein the voltage applied to the light source 1230 is removed to turn OFF the light source 1230.

Returning to step 3410, if motion is determined, then processing continues to step 3450, wherein a determination is made whether headlight assembly is within a nominal (or desired) orientation (similar to step 3430). If the orientation is within the nominal or desired orientation, processing continues to step 3470, wherein the output of the light source 1230 is retained in its current state. That is, a voltage applied to the light source 1230 is not changed. However, if the orientation of the headlight assembly 100 is not within the nominal or desired range, then processing proceeds to step 3460, wherein the voltage applied to the light source 1230 is removed to turn OFF the light source 1230.

Returning to step 3420, if no reflection is detected then processing continues at step 3450 to determine whether to turn the light source 1230 OFF or to retain the light in its current position, as previously discussed.

Although the processing shown in FIG. 34 illustrates a particular sequence of testing, it would be understood that that the processing may be performed in a different sequential order or in parallel, without altering the scope of the invention. In addition, the processing shown in FIG. 34 may be initiated by the generation of an "interrupt" caused by the detection of one or more of: a change in motion of the headlight assembly, the detection of a reflection and a change in the orientation of the headlight assembly.

For example, processing for the control of the application of a voltage/current to a light source may alternative comprise the steps of determining an orientation of the headlight assembly 100, using PDD 2230 and if outside a desired orientation then turn OFF the light. Otherwise, determination whether motion is detected. If motion is detected, then retain the current status of the application of a voltage/current to the light source. If motion is not detected, then determine whether a reflection has been detected. If not then retain the current status of the application of a voltage/current to the light source. However, if a reflection is detected, then alter the status of the application of a voltage/current to the light source.

In accordance with the principles of the invention, a headlight assembly is disclosed for providing reliable control of a user wearable light. The headlight assembly disclosed herein comprises a transmitter for transmitting a signal and a detector for detecting a reflection of the signal, wherein the detected reflection represents a control signal used to change or alter the application of a voltage to a light source within the headlamp assembly. Further disclosed is a motion sensor system configured to determine whether the headlight assembly is in a stable or in a moving condition. The determination of the motion sensor system is used to validate whether the detected reflection of the transmitted signal is to be used to change or alter the application of the voltage to the light. Validation of the detection of the reflected signal is deemed when the motion sensor system determines the headlight assembly is in a stable condition. Otherwise, the detection of the reflected signal is inhibited from altering or changing the application of the voltage to the light source 1230.

Although the present invention has been described with regard to an eyeglass configuration, it would be recognized that the cordless headlight assembly described herein may be applied to other types of headwear configurations. For example, a headband including one or more lens or a monocular assembly (which are referred to herein as eyewear) may incorporate the cordless headlight assembly described herein. Furthermore, although an LED type light is contemplated and discussed with the cordless headlight assembly described herein, it would be recognized that other types of lighting elements may be utilized without altering the scope of the invention claimed.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A headlight assembly comprising:
   a housing comprising:
      a light source; and
      a lens positioned in front of the light source;
   an electronic circuit comprising;
      a sensing element configured to:
         transmit a signal; and
         detect a reflection of the transmitted signal;
      a motion detector configured to:
         determine a motion of said headlight assembly; and
   a battery configured to provide a voltage to the electronic circuit, wherein the electronic circuit is configured to:
      receive the voltage from the battery;
      receive an indication of the detected reflection of the transmitted signal;
      receive an indication of the motion of the headlight assembly; and
      control an application of the voltage to the light source in response to the received indication of the detected reflection of the transmitted signal based of the indication of the motion of the headlight assembly.

2. The headlight assembly of claim 1, wherein the light source comprises at least one of: a white LED and a non-white LED.

3. The headlight assembly of claim 1, wherein the electronic circuit is configured to:
   alter the application of the voltage to the light source in response to the indication of the detected reflection of the transmitted signal and an indication of no motion of the headlight assembly.

4. The headlight assembly of claim 1, wherein the electronic circuit is configured to:
   retain the application of the voltage to the light source in response to the indication of the detected reflection of the transmitted signal and an indication of motion of the headlight assembly.

5. The headlight assembly of claim 1, wherein the motion detector comprises a gyroscope configured to measure changes in an orientation in at least one axis of a 3 axis coordinate system.

6. The headlight assembly of claim 5, wherein the gyroscope is configured to:
   compare outputs of corresponding ones of the at least one axis at different times; and
   indicate no motion when said outputs of corresponding ones of the at least one axis are substantially equal.

7. The headlight assembly of claim 5, wherein the gyroscope is configured to:
   determine a magnitude of the combined outputs of said at least one axis; and
   indicate no motion when said magnitude is within a known tolerance.

8. The headlight assembly of claim 1, wherein the motion detector comprises an accelerometer configured to measure changes in movement in at least one axis of a 3 axis coordinate system.

9. The headlight assembly of claim 8, wherein the accelerometer is configured to:
   compare outputs of corresponding ones of the at least one axis at different times; and
   indicate no motion when said outputs of corresponding ones of the at least one axis are substantially equal.

10. The headlight assembly of claim 8, wherein the accelerometer is configured to:
    determine a magnitude of the combined outputs of said at least one axis; and
    indicate no motion when said magnitude is within a known tolerance.

11. The headlight assembly of claim 1, wherein the sensor is configured to output one of: a Radio Frequency signal, an Infra-red signal, a visible signal, an Ultra-violet signal, an audio signal, and an ultra-sonic signal.

12. The headlight assembly of claim 11, wherein the outputted signal is transmitted in a direction along an axis in one of: a substantially horizontal and a substantially vertical axis.

13. The headlight assembly of claim 1, further comprising:
    a position detecting unit configured to:
       determine an orientation of the headlight assembly;
       output an orientation signal to the electronic circuit when the orientation of the headlight assembly is outside a desired range, wherein said electronic circuit is configured to:
    remove the application of the voltage to the light source in response to the orientation signal.

14. The headlight assembly of claim 1, wherein the at least one light source comprises a first set of light sources and a second set of light sources positionable substantially along the optical axis.

15. The headlight assembly of claim 14, comprising:
    a magnetic assembly, comprising:
    an electromagnet, wherein said electromagnet is configured to apply a force to position one of: the first set of light emitting diodes and the second set of light emitting diodes substantially centered along the optical axis.

16. The headlight assembly of claim 15, wherein the voltage is applied to the one of: the first set of light emitting diodes and the second set of light emitting diodes positioned substantially centered along the optical axis.

17. A headlight assembly comprising:
a battery pod comprising a battery configured to output a voltage;
a housing, attached to the battery pod, comprising:
   a light source;
   a position detecting unit configured to determine an orientation of the headlight assembly;
   a sensing element configured to:
      determine a request for a change of state of the light source;
   a motion detector configured to:
      determine a motion of said headlight assembly, and
   an processor configured to:
      control an application of the voltage to the light source in response to receiving at least one of: said request for a change of state of the light source, an indication of said determination of motion, and said determination of said orientation, wherein said application of said voltage is removed from said light source in response to said orientation being outside a desired range and retained when motion is determined.

18. A headlight assembly comprising:
a housing comprising:
   a light source;
a battery configured to provide a voltage to the light source; and
   a sensing element configured to:
      determine a request for a change of state of the light source;
   a motion detector configured to:
      determine a motion of said headlight assembly, and
      generate an indication of one of: motion and no-motion; and
   a processor configured to:
      receive the request for a change of state of the light source;
      receive said indication of one of: motion and no-motion; and
      control an application of the voltage to the light source in response to the received request for a change of state of the light source based on the received indication, wherein said application of said voltage to the light source is retained when motion is indicated and changed when no-motion is indicated.

19. The headlight assembly of claim 18, further comprising:
a position detecting unit configured to:
   determine an orientation of the headlight assembly;
   output an orientation signal when the orientation of the headlight assembly is outside a desired range, wherein the processor is configured to:
   remove the application of the voltage to the light source in response to receiving the orientation signal.

* * * * *